(12) United States Patent
Cheon et al.

(10) Patent No.: US 8,412,909 B2
(45) Date of Patent: Apr. 2, 2013

(54) DEFINING AND CHANGING SPARE SPACE AND USER SPACE IN A STORAGE APPARATUS

(75) Inventors: Wonmoon Cheon, Suwon-si (KR); Young-Goo Ko, Suwon-si (KR); Wonhee Cho, Suwon-si (KR); Yeon Ju Jeong, Suwon-si (KR); Donggi Lee, Suwon-si (KR); Hyuck-Sun Kwon, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 337 days.

(21) Appl. No.: 12/755,644

(22) Filed: Apr. 7, 2010

(65) Prior Publication Data
US 2010/0262765 A1 Oct. 14, 2010

(30) Foreign Application Priority Data

Apr. 8, 2009 (KR) .................................. 2009-30506
May 7, 2009 (KR) .................................. 2009-39905
Jun. 10, 2009 (KR) .................................. 2009-51625

(51) Int. Cl.
*G06F 12/02* (2006.01)
(52) U.S. Cl. ................. 711/173; 711/103; 711/E12.008
(58) Field of Classification Search .................. 711/103, 711/173, E12.008
See application file for complete search history.

(56) References Cited

U.S. PATENT DOCUMENTS

| 6,690,400 | B1 * | 2/2004 | Moayyad et al. ............. 715/779 |
| 7,573,744 | B2 | 8/2009 | Edahiro et al. |
| 8,001,356 | B2 | 8/2011 | Im et al. |
| 2007/0174549 | A1 * | 7/2007 | Gyl et al. ...................... 711/115 |
| 2008/0098166 | A1 | 4/2008 | Nakanishi et al. |
| 2008/0320214 | A1 * | 12/2008 | Ma et al. ....................... 711/103 |
| 2009/0259799 | A1 * | 10/2009 | Wong ............................ 711/103 |
| 2009/0300277 | A1 * | 12/2009 | Jeddeloh ....................... 711/104 |
| 2010/0023669 | A1 * | 1/2010 | Lee ................................ 710/301 |
| 2010/0235605 | A1 * | 9/2010 | Perry et al. .................... 711/170 |

FOREIGN PATENT DOCUMENTS

| JP | 2001-101877 | 4/2001 |
| JP | 2005-092677 | 4/2005 |
| JP | 2008-084499 | 4/2008 |
| JP | 2008-102774 | 5/2008 |
| JP | 2008-171103 | 7/2008 |

\* cited by examiner

*Primary Examiner* — Hal Schnee
(74) *Attorney, Agent, or Firm* — Stanzione & Kim, LLP

(57) ABSTRACT

A storage apparatus includes a memory unit and a controller to set up a memory space of the memory unit as a user data space and a spare space according to a signal representing at least one of the user data space and spare space. An electronic apparatus controls the storage apparatus, and a method controls at least one of the storage apparatus and the electronic apparatus to control a memory space of the storage apparatus.

20 Claims, 33 Drawing Sheets

Fig. 16

| Register | 7 | 6 | 5 | 4 | 3 | 2 | 1 | 0 |
|---|---|---|---|---|---|---|---|---|
| Fector Count | Subcommand Code ||||||||
| Sector Count | Sector Count(Low Order) ||||||||
| LBA Low | Sector Count(High Order) ||||||||
| LBA Mid | 00h ||||||||
| LBA High | 00h ||||||||
| Device | obs | na | obs | DEV | 0 | 0 | 0 | 0 |
| Command | 92h ||||||||

☒ : Spare
☐ : User Address

☒ : Spare
☐ : User Address

DEFINING AND CHANGING SPARE SPACE AND USER SPACE IN A STORAGE APPARATUS

CROSS-REFERENCE TO RELATED APPLICATIONS

This application claims the benefit of Korean Patent Application Nos. 2009-0030506 filed with the Korea Industrial Property Office on Apr. 8, 2009, 2009-0039905 filed with the Korea Industrial Property Office on May 7, 2009, and 2009-0051625 filed with the Korea Industrial Property Office on Jun. 10, 2009, the disclosures of which are incorporated herein by their references.

BACKGROUND OF THE INVENTION

1. Field

The present general inventive concept relates to a storage apparatus, a computer system having the storage apparatus, and method thereof, and more particularly, to apparatuses and methods of a storage system to have a variable storage area.

2. Description of the Related Art

A conventional host computer includes a plurality of memory units to store data. The memory units have a log area to temporarily store the data and a data area to store the temporarily stored data. The memory units are, for example, an HDD, a FDD, a DRAM, an SRAM, a flash memory, a flash EEPROM, etc. However, the data area and the log area are fixed within the memory units, causing a slow speed of the memory unit in reading and writing and a low performance of the host computer in processing.

SUMMARY

The present general inventive concept provides a storage apparatus having a variable memory space.

The present general inventive concept provides a computer apparatus to generate a signal representing a variable storage area of a storage apparatus.

The present general inventive concept provides a computer system having a storage apparatus and a computer apparatus to control a variable storage area of the storage apparatus.

The present general inventive concept provides methods of controlling a variable storage area of a storage apparatus.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a storage apparatus including a memory unit, and a controller to set up a memory space of the memory unit as a user data space and a spare space according to a signal representing at least one of the user data space and spare space.

The foregoing and/or other aspects and utilities of the present general inventive concept may also be achieved by providing a storage apparatus including a memory unit having a memory space, and a controller to output a signal to an external apparatus to indicate that the memory space is a variable memory space, and to control the memory space to have a user data space and a spare space upon receiving another signal from the external apparatus in response to the output signal.

The foregoing and/or other aspects and utilities of the present general inventive concept may also be achieved by providing a host apparatus including an interface to generate an interface signal representing a window to be displayed to receive an input from a user, and a controller to generate a signal, according to the input, to a storage apparatus, and to control the storage apparatus to determine a portion of a memory space of a memory unit of the storage apparatus as one of a data block and a log block according to the generated signal.

The foregoing and/or other aspects and utilities of the present general inventive concept may also be achieved by providing a computing system including a host apparatus having an interface to generate an interface signal representing a window to be displayed to receive an input from a user, and a controller to output a signal according to the input, and a storage apparatus connectable to the host apparatus, and having a memory unit having a memory space, and a controller to designate a portion of the memory space of the memory unit as one of a data block and a log block according to the signal received from the host apparatus.

The foregoing and/or other aspects and utilities of the present general inventive concept may also be achieved by providing a storage apparatus including a first memory unit having a fixed data area to store first data, a second memory unit having a variable data area to store second data, and a controller to control the first memory unit to process the first data, and to control the second memory unit to designate a portion of a memory space of the second memory unit as the variable data area and a variable log block according to a signal received from a host apparatus.

The foregoing and/or other aspects and utilities of the present general inventive concept may also be achieved by providing a storage apparatus including a printed circuit board, a first memory unit fixed to the printed circuit board to store first data, a second memory unit electrically detachaby attachable to the printed circuit board and having a variable area usable to store second data, and a controller to control the first memory unit to process the first date without changing a memory space thereof, and to control the second memory unit to change the variable area of a memory space thereof according to a signal received from a host apparatus.

The foregoing and/or other aspects and utilities of the present general inventive concept may also be achieved by providing a storage apparatus including a plurality of memory units, and a controller to control one of the memory units to store data to designate a portion of a memory space of the one memory unit as one of a variable data area and a variable log block according to a signal received from a host apparatus, and to control another one of the memory units to store data without determining any portion of a memory space as a data area and a log area.

The foregoing and/or other aspects and utilities of the present general inventive concept may also be achieved by providing a storage apparatus including a plurality of memory units, and a controller to receive a signal from a host apparatus, the signal representing a change of a memory space, and to apply the signal to all memory units to designate a portion of each memory space of the memory units, as one of a variable data area and a variable log block.

The foregoing and/or other aspects and utilities of the present general inventive concept may also be achieved by providing a storage apparatus including a plurality of memory units, and a controller to receive a signal from a host apparatus, the signal representing a change of a memory space, and to selectively apply the signal of the change of the memory space to at least one of the memory units to change at least one of a variable data area and a variable log block of the memory space.

The foregoing and/or other aspects and utilities of the present general inventive concept may also be achieved by providing a method of changing a memory space in a storage apparatus, the method including receiving a signal from an external apparatus; and designating a portion of the memory space of the memory unit as one of a user data space and a spare space according to the received signal.

The foregoing and/or other aspects and utilities of the present general inventive concept may also be achieved by providing a computer readable medium to contain computer readable codes as a program to perform a method of changing a memory space in a storage apparatus, the method including receiving a signal from an external device; and designating a portion of the memory space of the memory unit as one of a user data space and a spare space according to the received signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 16 is a view illustrating a micro code to change a physical memory space;

DETAILED DESCRIPTION OF THE EMBODIMENTS

Figure 1A:
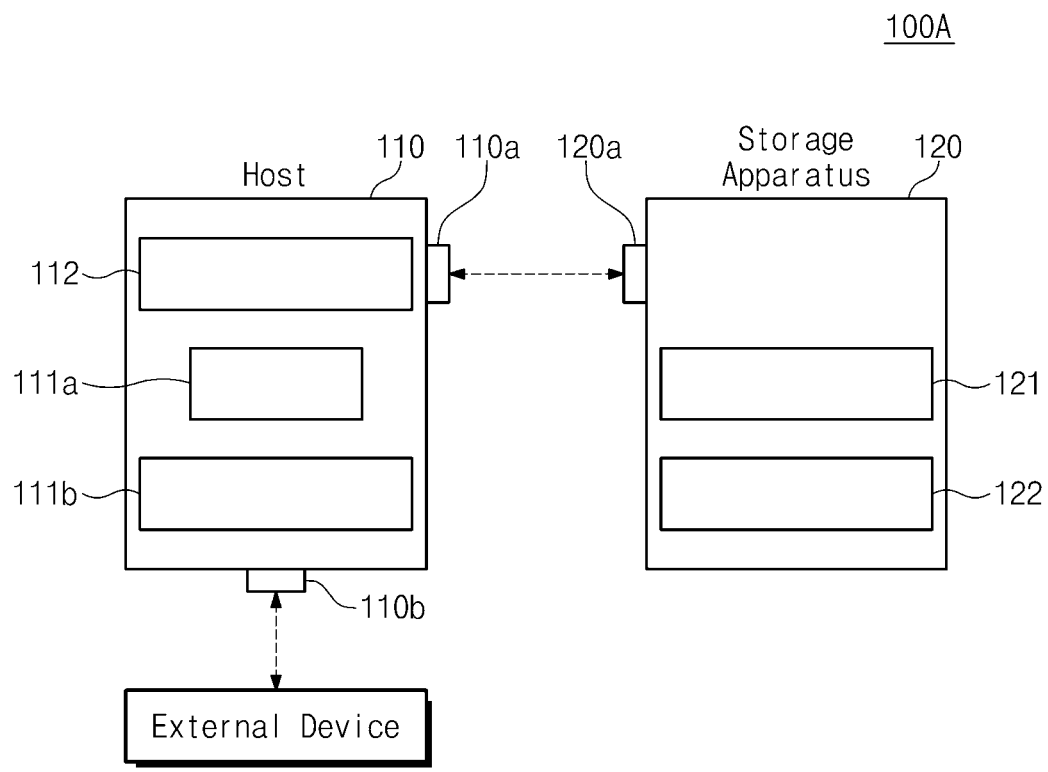
FIGS. 1A and 1B are views illustrating a computing system having a storage apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1B:
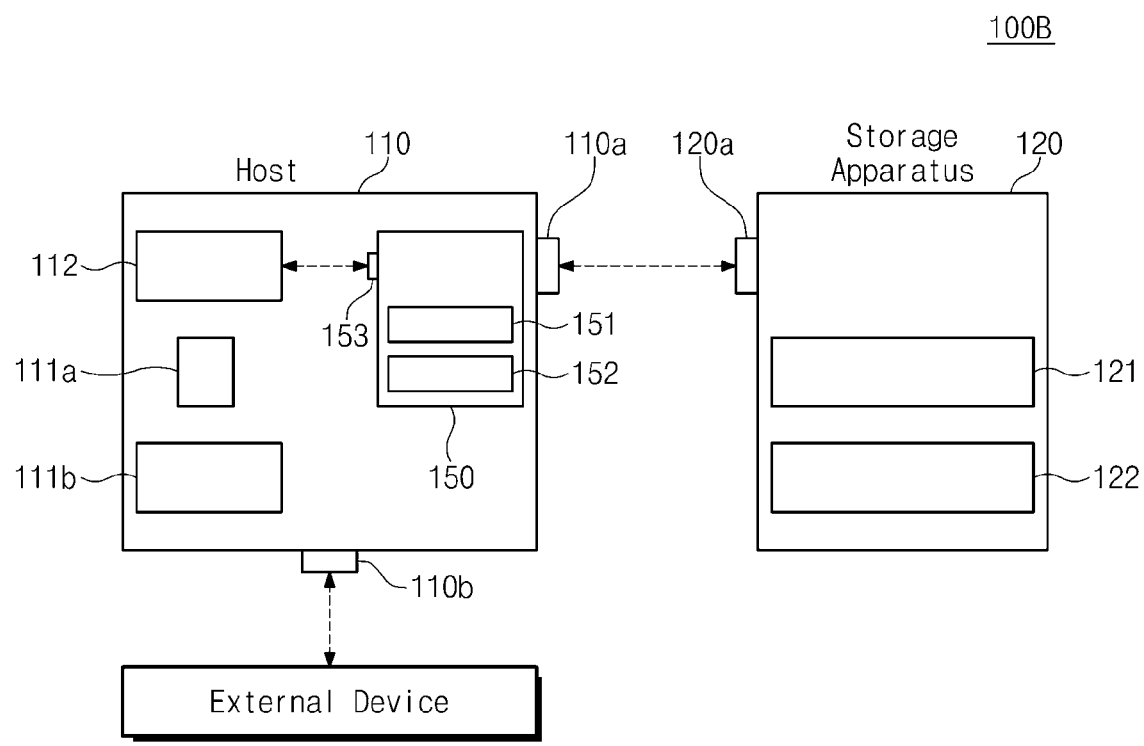

FIGS. 1A and 1B are views illustrating a computing system 100A and 100B having a storage apparatus 120 and/or 150 according to an embodiment of the present general inventive concept.

The computing system 100A and 100B may be an electronic apparatus having a storage apparatus having a variable memory space to store data therein. The electronic apparatus may include a host apparatus 110 and/or the storage apparatus 120. The host apparatus 110 may be a computer apparatus to compute or process data, a portable electronic apparatus to generate an image signal and a sound signal using data, a display apparatus to display an image using data, a telecommunication terminal or a mobile phone to communicate with other mobile phone terminals or phone service providers to transmit and receive data, an image processing and/or forming apparatus to process an image and/or form an image using data, etc. The electronic apparatus may have a function unit 111b to perform at least one operation corresponding to at least the above-described operations thereof. Since the corresponding operations of the electronic apparatus are well known, detailed descriptions thereof will be omitted.

Referring to FIG. 1A, the host apparatus 110 includes a terminal 110a connectable to a terminal 120a of the storage apparatus 120. The terminal 110a may be directly connected to the terminal 120a of the storage apparatus 120. It is also possible that the host apparatus 110 can be connected to the storage apparatus 120 through the terminals 110a and 110b and a wired or wireless communication line.

The host apparatus 110 may be a user host apparatus or a manufacturer host apparatus. When the host apparatus 110 is the user host apparatus, the storage apparatus 120 may be used by a user to set up a memory space thereof and to read and write data. When the host apparatus 110 is the manufacturer host apparatus, the storage apparatus 120 may be used by a manufacturer to setup a variable memory space and then used by a user to read or write data on the setup memory space. It is possible that the user can change or adjust the memory space previously setup by either the user or the manufacturer. It is also possible that the user can re-setup the memory space.

The host apparatus 110 may have a memory 111a, such as ROM and RAM, to store programs and/or data to operate operations of the host apparatus 110. However, the memory 111a may be disposed in the function unit 111b. In this case, the memory 111a and the function unit 111b may be referred to as the controller 111b.

The memory 111a may be a memory unit having a variable memory space (variable physical memory space) or a memory unit having a non-variable memory unit (fixed memory unit). Here, the variable memory space is referred to as a memory space of which amount, capacity, size, and/or characteristic can be variable when the storage apparatus 120 is initialized or activated or used. The fixed memory space is referred to as a memory space which is not variable or changeable but fixed during a life span of a storage apparatus.

The host apparatus 110 may have a terminal 110b to communicate with an external device through a wired or wireless communication line to receive and transmit data. The terminal 110b may include a module, a wired or wireless interface unit, transmitter/receiver unit, etc., to generate a signal to be transmitted to the external device or to receive a signal from the external device.

The storage apparatus 120 may be a flash memory, a module (or package) of a plurality of semiconductor memory chips, a semiconductor solid state disk/drive (SSD), a memory card, etc., to store data. The storage apparatus 120 has a memory space (or physical memory space) to store data or information. The physical memory space of the flash memory storage apparatus 120 may be variable. It is possible that the host apparatus 110 may generate a control signal or a request signal to control or request the storage apparatus 120 to set up or change a characteristic of the physical memory space. It is also possible that the storage apparatus 120 may generate a control signal or a request signal to the host apparatus 110 to set up or change a characteristic of the physical memory space. The variable physical memory space of the storage apparatus 120 may include a usable memory space or a user address space which can be shown as an available memory space of the storage apparatus 120 to a user through an interface or a window generated by the host apparatus 110 or the storage apparatus 120. That is, the physical memory space of the storage apparatus 120 may be a data storage space usable to store data which can be read or written by the host apparatus 110 to perform a method of the computing system 100A.

The storage apparatus 120 may have a memory unit 121 to store data and a control unit 122 to control the memory unit 121 to set up or change a physical memory space in which the data is stored. The memory unit 121 may have a variable physical memory space. The memory unit 121 may be a plurality of memory units (sub-memory units) with a variable physical memory space. The control unit 122 may have one or more additional memory units, such as ROM and/or RAM, to store data which can be used to control the storage apparatus 120 and/or the host apparatus 110.

Referring to FIG. 1B, the host apparatus 110 may further include a memory 111a, a function unit 111b, a controller 112, and another memory apparatus 150 having a memory unit 151 and a controller 152 to control the memory unit 151. The controller 152 of the another memory apparatus 150 may be connected to the storage apparatus 120 through terminals 110a and 120a, may be connected to the memory 111a through terminals thereof (not illustrated), and may be connected to the controller 112 of the host apparatus 110 through a terminal 153. The another memory apparatus 150 may be the same or similar to the storage apparatus 120 having a variable memory space to store data. The another storage apparatus 150 may be disposed and installed inside a housing of the host apparatus 110, and the storage apparatus 120 is disposed outside the housing of the host apparatus 110 and is detachably attached or connected to the housing of the host apparatus through the terminals 110a and 120a.

Figure 2:
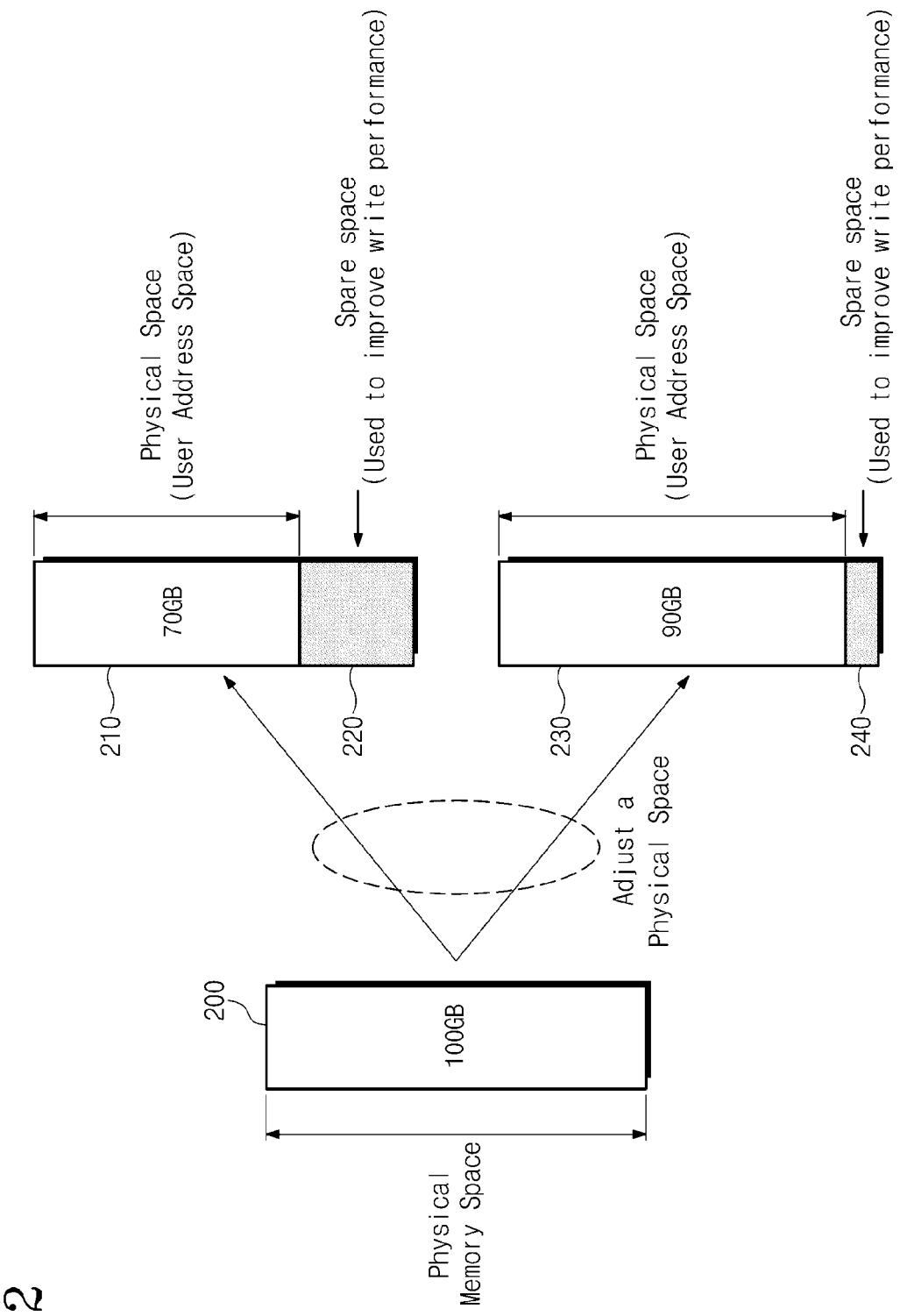
FIG. 2 is a view illustrating a variable memory space of a memory unit of the storage apparatus of FIGS. 1A and 1B.

Referring to FIG. 2, a memory unit of a storage apparatus may have a physical memory space 200, for example, 100 GB. A first portion of the physical memory space 200 may be used as a user address space (user usable memory space) 210, and a second portion of the physical memory space may be used as a spare space 220 having log blocks and free blocks. As illustrated in FIG. 2, 70 GB of the physical memory space 200 can be assigned, set, changed, or designated to the user address space 210, and 30 GB of the physical memory space 200 assigned to the spare space 220. It is possible that 90 GB is assigned as the user address space 230 and 10 GB is assigned as the spare space 240. The physical memory space 200 may be divided into at least two spaces as user address space and the spare space which are variable, changeable, adjustable, and determinable according to a user preference.

That is, the physical memory space 200 can be designated or modified as the user address space of 90 GB or 70 GB, according to a control signal or a request signal from the host apparatus 110 of FIGS. 1A and 1B. In this case, although an original memory space of the physical memory space 200 of the storage apparatus 120 is 100 GB, the user usable memory space of the physical memory space 200 which is usable by a user (or the host apparatus 110) can be 90 GB or 70 GB. The physical memory space 200 usable by a user is designated or modified as the user usable memory space 210 or 230, for example, 90 GB or 70 GB. Here, the change, designation, modification of the user usable memory space and/or the physical memory space may be different from division (partition) of a physical space of a memory unit. An original physical memory space of the physical memory space 200 may not be changed or reduced according to the change, designation, modification of the user usable memory space and/or the physical memory space. When a portion of the original physical memory space is designated as the user usable memory space, a remaining portion of the original physical memory space is referred to as a spare space or extra space. Therefore, the user usable memory space of the memory unit corresponds to a physical user space (or user address space), and the spare space is not included in but excluded from the user usable memory space or the physical user space. A capacity of the memory unit to store data corresponds to an amount of the user useable memory space. Performance of the storage apparatus 120 depends on the spare space of the memory unit of the storage apparatus 120. Therefore, the performance of the storage apparatus 120 is controlled (decreased or increased) according to change, adjustment, or modification of the spare space.

The host apparatus 110 generates a logical address to access the storage apparatus 120. The logical address is an address recognized by an operation system or an application program of the host apparatus 110 to correspond to a physical location of a memory area of the memory unit to store data. Accordingly, the local address is converted into a physical address (location of a memory area) of the storage apparatus 120 so as to access (read and write) data of a designated memory area of the memory unit.

In a case that the storage apparatus 120 includes a flash memory, the flash memory storage apparatus 120 may have an additional disk emulation program to provide compatibility with the host apparatus 110 during an accessing operation of the host apparatus 110 and the flash memory storage apparatus 120. The storage apparatus 120 having one or more flash memories is referred to a flash memory storage apparatus. However, the present general inventive concept is not limited thereto. A storage apparatus having another type of one or more memories can be used as the storage apparatus 120. During the accessing operation, the compatibility between the host apparatus 110 and the flash memory storage apparatus 120 can be provided using a file system, such as a flash translation layer (FTL) as firmware. That is, the host apparatus 110 recognizes the flash memory storage apparatus 120 as an HDD and/or SRAM and accesses the flash memory storage apparatus 120 using the same method of accessing the HDD and/or SRAM. The FTL connects the flash memory storage apparatus 120 to the file system used by the operation system of the computer system 100A or 100B, and does not allow writing data at the same address without erasing data.

The FTL may include various functions, for example, a logical address—physical address mapping information managing operation, a bad block managing operation, a data preserving operation to store data at an abrupt power interruption or power off, a wear and tear managing operation, etc.

When the flash memory of the storage apparatus 120 is accessed in a block unit, the flash memory is divided into a plurality of blocks. Numbers sequentially assigned to the divided blocks are referred to as physical block addresses, and virtual numbers of the divided blocks recognized by a user or the host apparatus 110 are referred to as local block addresses. A mapping method of mapping the physical block addresses and the logical block addresses may include a block mapping method, a sector mapping method, and a log mapping method, for example. The above described-mapping methods are illustrated in U.S. Pat. No. 5,404,485, entitled "FLASH FILE SYSTEM," U.S. Pat. No. 5,937,425, entitled "FLASH FILE SYSGTEM OPTIMIZED FOR PAGE-MODE FLASH TECHNOLOGIES," U.S. Pat. No. 6,381,176 entitled "METHOD OF DRIVING REMAPPING IN FLASH MEMORY AND FLASH MEMORY ARCHITECTURE SUITABLE THEREFOR," U.S. Patent Publication No. 2006-0004975 entitled "INCREMENTAL MERGE MEHTODS AND MEMORY SYSTEM INCLUDING THE SAME."

In the FTL of the mapping method, data having sequential logical addresses may be written at physically different locations, physically separated locations, or non-sequential order. Since the flash memory has an erasing unit greater than a writing (or program) unit, the flash memory may collect the sequential data of sequential logical addresses distributed or stored at physically different (physically non sequential) locations in the same address area, which is referred to as a merging operation. This merging operation requires a plurality of program operations and block erasing operations, thereby deteriorating writing performance and efficiency of the storage apparatus 120.

Figure 3:
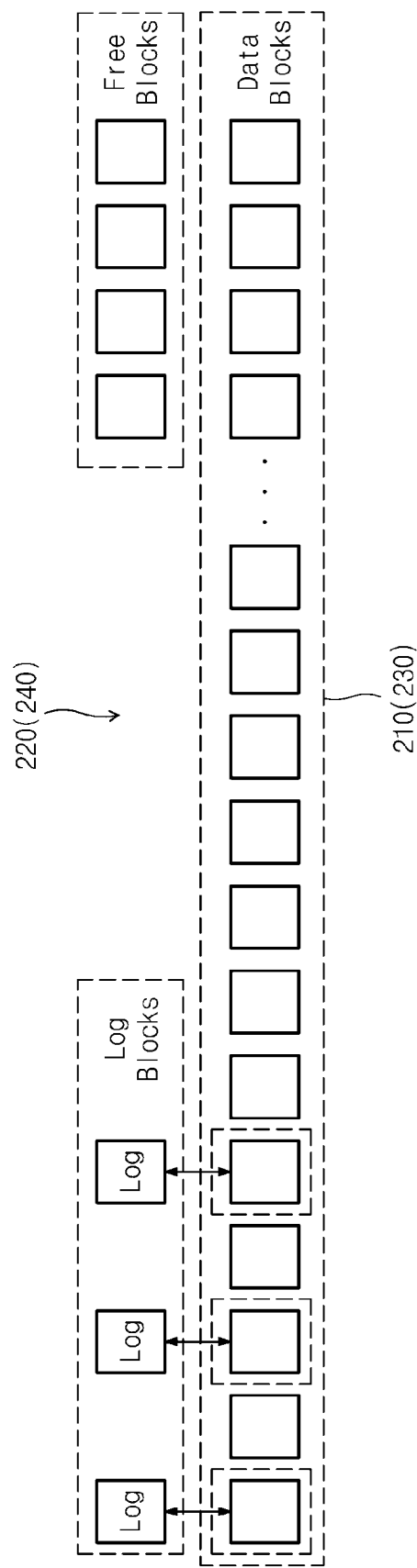
FIG. 3 is a view illustrating a mapping method of mapping blocks of a physical space and a spare space of a memory unit of a storage apparatus.

FIG. 3 illustrates a log mapping method of mapping blocks of the physical space as the user usable space 210 (230) and the spare space 220 (240). Referring to FIG. 3, a plurality of log blocks are included in the spare space 220 (240) to correspond to the respective data blocks. Referring to FIG. 3, the number of blocks in the user address space 210 (230) and the number of blocks of the spare space 220 (240) are changed or different from the number of blocks in the user address space 210 (230) and the number of blocks of the spare space 220 (240) as illustrated in FIG. 3. The physical memory space is divided into one or more data blocks, one or more log blocks, and one or more free blocks. The data blocks are used to store user data in a block unit, the free blocks do not store the user data or are blocks which do not correspond to a user address space, and the log blocks are a page mapping block and represent a memory block in a page unit compared to a block unit of the data blocks. The log blocks may be referred to as a buffer block. When previous user data are stored in the data blocks, and an update request is received to update the previous user data, the free blocks are mapped to be assigned as log blocks. The free block assigned as the log block is used to perform a writing operation to correspond to the user address space of the mapped data blocks.

The flash memory storage apparatus 120 has a capacity useable by a user, and the user usable capacity corresponding to a physical memory space thereof is the same as or similar to the total amount (space or size) of the data blocks. However, the free and log blocks may not be included in the user usable capacity. That is, the log blocks and the free blocks are included in the spare space (or extra space). Therefore, if a total capacity of an original physical memory space of the physical memory space is not changed, a capacity (amount) of the log blocks and/or the free blocks is changed according to the capacity of the user usable capacity corresponding to the physical memory space. If the capacity of the user usable capacity is increased, the capacity of the log and/or free blocks is decreased. Accordingly, if the capacity of the user usable capacity is decreased, the capacity of the log and/or free blocks is increased.

Since the flash memory may not perform an overwriting operation to overwrite new or update data over previous data without erasing the previous data, one or more blocks are required to perform an updating operation as the free blocks. In a log mapping method, an efficiency of the flash memory storage apparatus 120 is increased or decreased according to the number of free blocks. For example, when the flash memory storage apparatus 120 includes 8192 memory blocks, 8000 memory blocks are assigned or designated as data blocks, and a remaining number of memory blocks are assigned or designated as log blocks and/or free blocks. In this case, the number of log blocks may not be greater than 191. When the maximum number of log blocks is limited to 191, the FTL performs the merging operation. As described above, the merging operation includes collecting recent pages existing in the data block and the log block, forming a data block from the collected pages, and changing the data blocks and the log blocks as free blocks. Since additional operations of a plurality of programs and a block erasing operation are included in the merging operation, a performance (efficiency or processing speed) of the flash memory storage apparatus 120 is decreased. When the merging operation is repeated or frequently performed, the performance of the flash memory storage apparatus 120 is changed accordingly a frequency of the merging operations. Since the merging operation includes a user data writing operation in addition to the additional operations of a plurality of programs generated in the FTL and the block erasing operation, a life span of the flash memory storage apparatus 120 may be shortened. Therefore, the number of log blocks assignable or available in the flash memory storage apparatus 120 affects the performance and the life span thereof. That is, when the number of log blocks that is the number of memory blocks of the spare space is increased, the performance is improved and the life span is extended.

As described above, in a mapping method, for example, a block mapping method or page mapping method as well as the log mapping method, the performance and life span of the flash memory storage apparatus 120 may be affected according to a ratio of a capacity (or amount) of the user usable space and an additional storage space (spare space). In the page mapping method, when a request is received to overwrite a new page over previous written page, the new page is written and the previous written page becomes invalidated. Since the invalidated pages are separated and dispersed throughout the entire data blocks of the physical memory space, the page mapping operation requires additional operations of removing the invalidated pages and collecting the valid recent pages. The additional operations are referred to as a compaction operation or a garbage collection operation. Since the compaction operation includes operations of performing a plurality of additional programs and an erasing operation in addition to a user's writing request, the performance of the flash memory storage apparatus 120 is decreased. Accordingly, when a frequency of the compaction operations is decreased or when the number of pages copied in the compaction operations is decreased, the performance of the flash memory storage apparatus 120 can be improved. That is, the performance of the flash memory storage apparatus 120 can be improved according to a ratio of a user usable space and the spare space.

As described above, a writing performance of the flash memory storage apparatus 120 is controlled according to a ratio of the physical memory space and the spare space or a capacity (amount) of the spare space. According to an embodiment of the present general inventive concept, the additional memory space, that is the spare space, can be provided by controlling the physical memory space or the user usable (address) memory space, thereby improving the performance of the flash memory storage apparatus 120.

Figure 4:
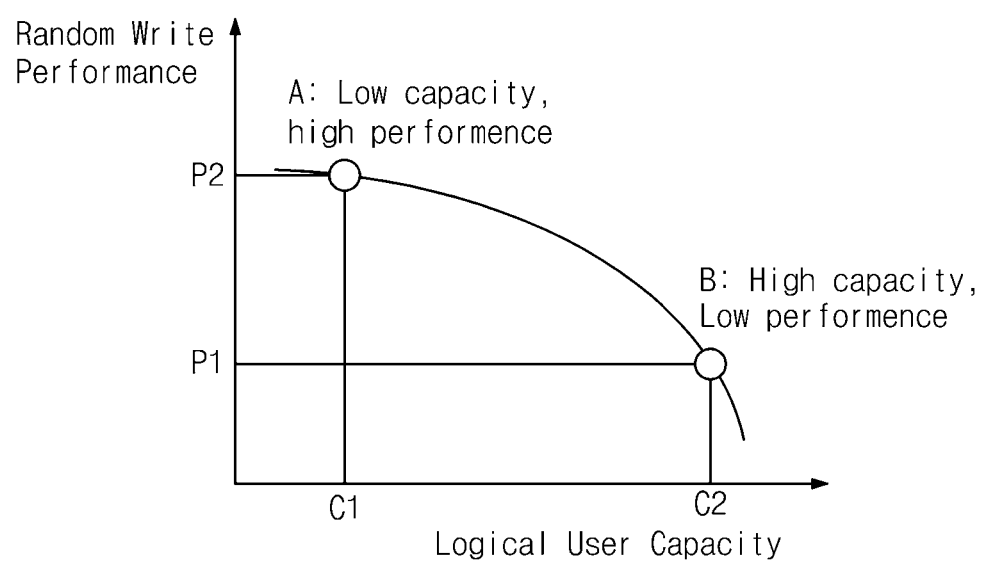
FIG. 4 is a graph illustrating a relationship between a storage capacity and a writing and/or reading performance.

FIG. 4 illustrates a relationship between a storage capacity and writing and/or reading performance. Although a graph illustrated in FIG. 4 may be changed or adjusted according to an algorithm or method of the FTL, the relationship between the storage capacity and the performance is maintained as illustrated in FIG. 4. The performance can be improved by reducing at least a portion of the user usable memory space (user address memory space or user address space). According to an embodiment of the present general inventive concept, the user usable memory space is reduced or the spare space is increased, thereby to improve the performance.

The graph illustrates a point A indicating a low capacity C1 and a high performance P2 and a point B indicating a high capacity C2 and a low performance P1. Therefore, the improvement of the performance of the flash memory storage apparatus is dependent from a decreased capacity (amount) of the user memory space. It is possible that the improvement of the performance of the flash memory storage apparatus is dependent from an increased capacity (amount) of the spare space.

Figure 5:
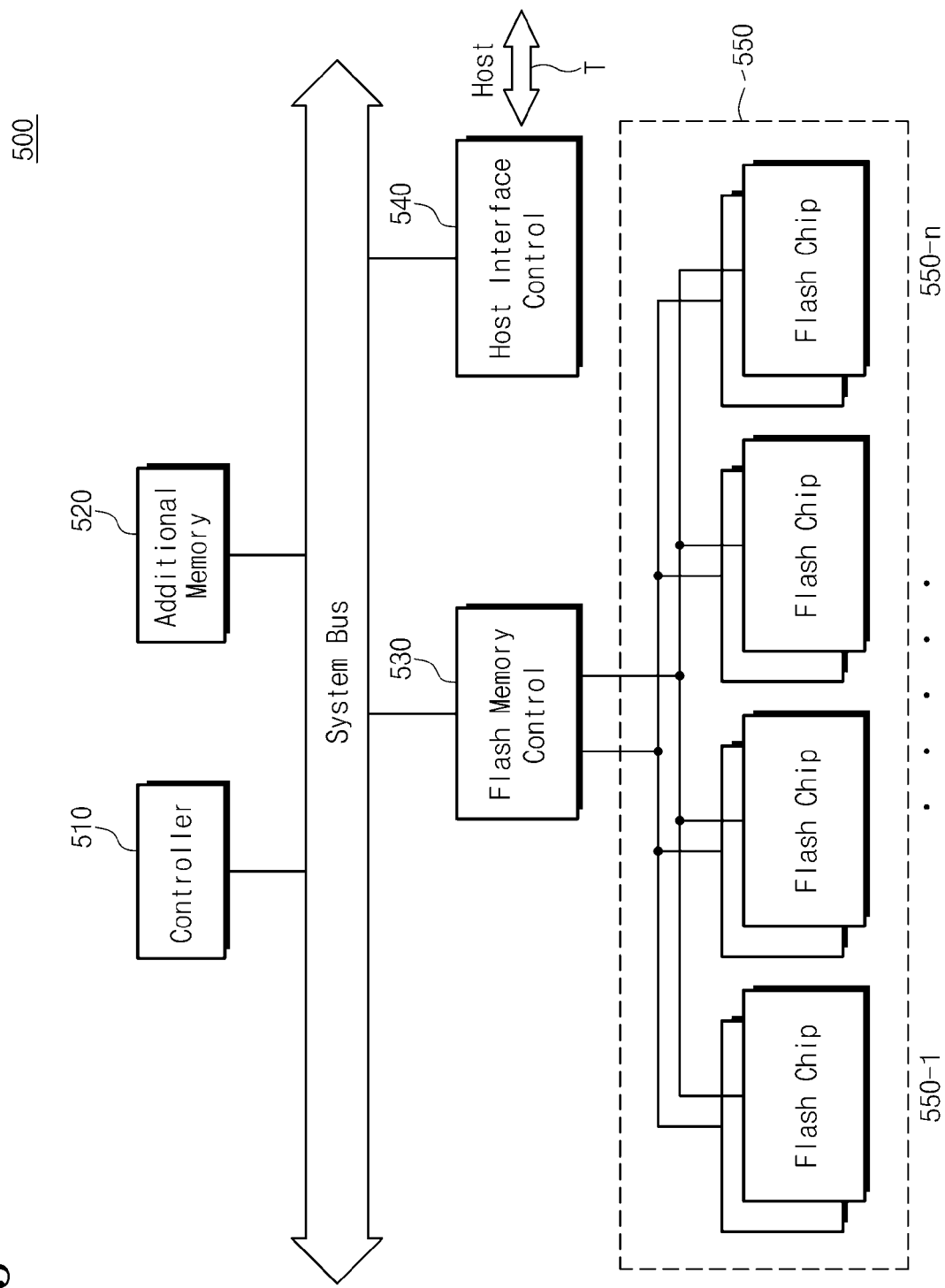
FIG. 5 is a view illustrating a flash memory apparatus having a plurality of memory units according to an embodiment of the present general inventive concept.

FIG. 5 illustrates a storage apparatus 500 having a memory unit 550 according to an embodiment of the present general inventive concept. The storage apparatus 500 may be a flash memory storage apparatus. The storage apparatus 120 of FIGS. 1A and 1B may be used as the storage apparatus 500 of FIG. 5. The memory unit 550 may be a single semiconductor chip having a plurality of memory areas, such as a plurality of sub-memory units 550-1 . . . 550-n. It is possible that the memory unit 550 can be formed with a plurality of semiconductor chips, such as a plurality of sub-memory units 550-1 . . . 550-n. It is also possible that the memory unit 550 can be formed with a plurality of flash memory semiconductor chips, such as 550-1 . . . 550-n. The flash memory semiconductor chips may be referred to as flash memories or flash memory chips. One or more of the plurality of sub-memory units 550-1 . . . 550-n may be a variable memory unit having a variable physical memory space to be set or changed after the storage apparatus 500 is manufactured.

The flash memory storage apparatus 500 may further include a controller 510, a host interface control unit 540 to communicate with a host apparatus through a terminal T, an additional memory unit 520, and a flash memory controller 530 to control the memory unit 550. The controller 510 may be referred to as a central processing unit (CPU). The controller 510, the additional memory unit 520, the flash memory control unit 530, and the host interface control unit 540 may be included in or referred to as the controller 510 to control the memory unit 550 and/or the host apparatus 110. It is possible that the flash memory control unit 530 may be included in the controller 510. It is also possible that the flash memory control unit 530 may be included in the memory unit 550 or in at least one of the sub-memory units 550-1 . . . 550-n.

The controller 510 controls operations of units and/or components of the flash memory storage apparatus 500. The additional memory unit 520 includes at least one of random access memories (RAMs) and/or read only memories (ROMs) as data memory and/or work memory. The RAMs may be SRAM, DRAM, etc. The flash memory control unit 530 controls an operation of accessing the memory unit 550 and may include an error correction code engine unit (not illustrated) to provide an error correction. When the controller 510 is a high performing processing unit, the error correction code engine unit may be included in the controller 510 using an error correction program to provide the error correction. When the flash memory storage apparatus 500 is a memory card, the host interface control unit 540 provides an interface with the host apparatus using an SD card interface or an MMC card interface. When the flash memory storage apparatus 500 is a solid state device (SSD), the host interface control unit 540 provide an interface with the host apparatus using PATA interface, SATA interface, SAS interface, PCI-express interface, etc.

The storage apparatus 500 or the memory unit 550 may further include device data (meta data), for example, maker (manufacturer) information, capacity information indicating a physical memory space, a maximum of LBA addresses, and so on, a firmware, such as an FTL, etc. The FTL generates a mapping table required to a mapping operation using the capacity information indicating the physical memory space. The capacity information, for example, the maximum number of LBA addresses, indicating an actual amount (size) of the flash memory storage apparatus 500 is provided to the host apparatus upon request from the host apparatus.

The storage apparatus 500 or memory unit 550 may further include information data indicating that a physical memory space of the memory unit 550 is not fixed but variable and/or additional information indicating a setup to set the physical memory space into a user address space and a spare space. The information data and/or the additional information are transmitted to the host apparatus to set up the user address space and the spare space of the memory unit 550.

The host apparatus 110 transmits a signal, for example, "IDENTITY DEVICE," to the flash memory storage apparatus 500, and the flash memory storage apparatus 500 transmits information indicating the amount (size) of the physical memory space, a maximum number of LBA addresses and/or values, to the host apparatus 110 according to the signal. The host apparatus 110 performs a disk format operation, for example, low-level formatting, partitioning, high-level formatting, etc., and/or preparing host protected area (HPA) according to the information on the memory unit 550.

The information on the amount (size) of the physical memory space and/or a maximum LBA addresses/values may be changed or adjusted in the flash memory storage apparatus 500 when the flash memory storage apparatus 500 receives from the host apparatus 110 a signal or command, for example, SET_NATIVE_MAX_ADDRESS.

Figure 6:
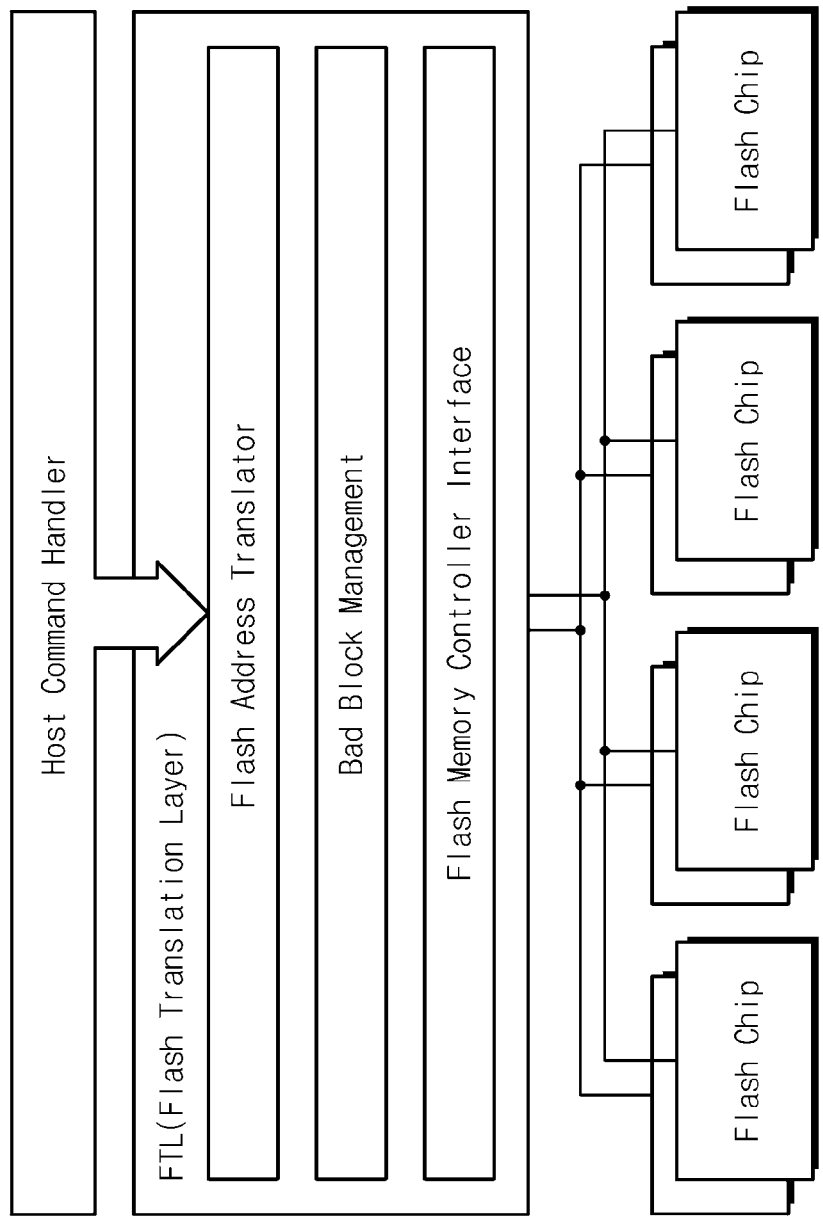
FIG. 6 is a view illustrating a storage apparatus having a plurality of flash chips as a module or a package according to an embodiment of the present general inventive concept.

FIG. 6 is a view illustrating a module structure of a storage apparatus (or the flash memory storage apparatus 500 of FIG. 5). The module structure may include a module having a host command handler to analyze a command received from the host apparatus 110. Since the reading/writing locations (logical addresses) requested by the host apparatus 110 are not the same as or do not correspond to physical addresses of the flash memory storage apparatus 500, the FTL, as a module, is required to convert the logical addresses into the physical addresses. The FTL may include an address translator to translate the logical addresses into the physical address (flash memory address) and a bad block managing module to register a block as a bad block when an erasing data operation or program operation on the block fails, and to replace the bad block with a new or other block to write corresponding data thereon. The FTL may further include a flash memory control interface unit to control the flash memory chips and to access the respective flash memory chips to perform reading, programming, erasing, etc.

Figure 7:
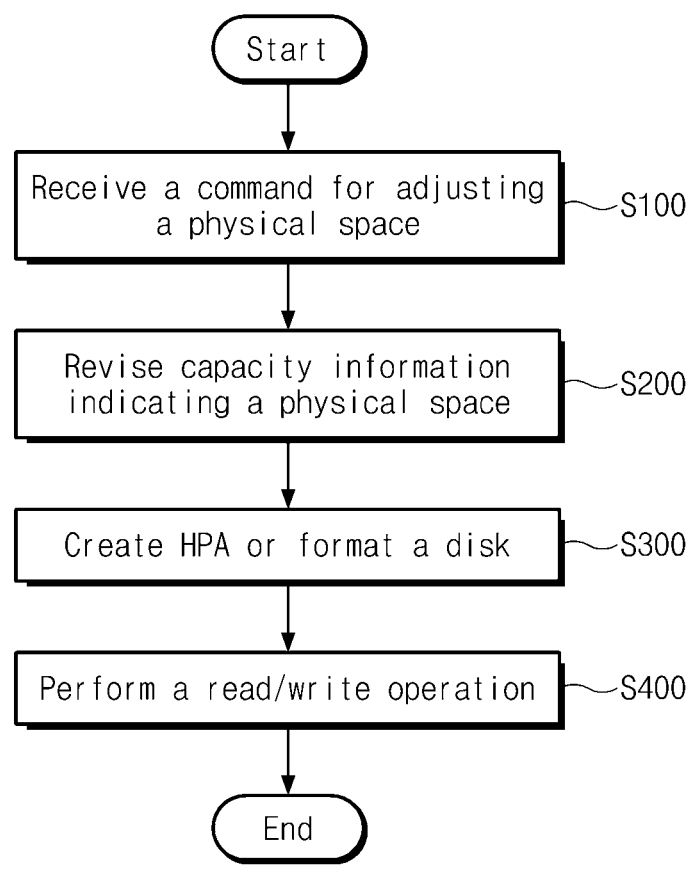
FIG. 7 is a flowchart illustrating a method of setting a memory space and reading/writing using the set memory space according to an embodiment of the present general inventive concept.

FIG. 7 is a flowchart illustrating a method of setting up a memory space of a storage apparatus and reading/writing using the setup memory space according to an embodiment of the present general inventive concept. The storage apparatus may be a flash memory storage apparatus, and the memory space may be a physical memory space.

The setting up of the memory space may include changing one or more characteristics of the memory space, dividing the memory space into a plurality of memory spaces, dividing the memory space according to different usages, dividing the memory space into a user address space and a spare space, designating one or more portions of the memory space as a user address space and a spare space, changing a first portion of the memory space from a first usage to a second usage, changing a location of a portion of the memory space for a first usage to another location of another portion of the memory space for the first usage, determining a ratio of different portions, such as the user address space and the spare space, etc. However, the present general inventive concept is not limited thereto. It is possible that the setting up includes exchanging a first usage and a second usage in a portion of the memory space. It is also possible that the setting up includes replacing a first portion of the memory space with a second portion of the memory space to perform a same usage operation.

The flash memory storage apparatus 500 receives a signal or command, for example, SET_NATIVE_MAX_ADDRESS, from the host apparatus 110 in operation S100. The signal or command may be a command to indicate a change of capacity information on the physical space, for example, a change of a maximum LBA. The flash memory storage apparatus 110 changes the capacity information to new capacity information, for example, the maximum LBA to a new maximum LBA, according to the signal and/or capacity data to update the capacity information in operation S200. When the capacity information is changed to the received capacity data, for example, when the maximum LBA is changed to an update maximum LBA, the physical memory space (user address space) varies.

As described above, the change or adjustment of the physical memory space provide a spare space enough to improve a writing performance of the flash memory storage apparatus 500. The spare space is not included in a user capacity (user address space) and is an extra or additional memory space of the flash memory storage apparatus 500. Blocks (memory blocks) of the spare space are used as a log block and/or a free block in a log mapping method. The blocks of the spare space can be used to manage a bad block. However, the present general inventive concept is not limited thereto. It is possible that one or more of the blocks of the spare space can be used for other purposes.

When the physical memory space, the user address space, and/or the spare space are determined, the user capacity is determined according to the determined physical memory space, user address space, and/or spare space as illustrated in FIG. 2. When the space is determined, a disk format operation is performed to use the memory space of the flash memory storage apparatus 500, and/or the HPA is formed according to ATA standard, upon a request from the host apparatus 110, in operation S300. Since the disk formatting operation and the HPA forming operation are well known, detail descriptions will be omitted. The flash memory storage apparatus 500 performs a reading/writing operation according to a request from the host apparatus 110 in operation S400.

Although the method illustrates the partitioning operation and the HPA forming operation in operations S300 and S400, respectively, performed in a computing system, operations S100 and S200 or operations S100, S200, and S300 can be performed by a manufacturer before a flash memory storage apparatus is released by the manufacturer. However, when a predetermined signal or command is provided to a user, the user can select a writing performance and a user capacity by performing the operations S100 and S200 or the operations S100, S200, and S300 after the flash memory storage apparatus is released or after the user obtains the flash memory storage apparatus.

As described above, a memory space of the flash memory storage space includes a user address space and a spare space, and the user address space includes blocks (memory blocks or data blocks) of the physical memory space which can be shown to or recognized by the user. Accordingly, the user capacity can be determined by the user address space. The spare space includes blocks (memory blocks) used to improve writing performance of the flash memory storage apparatus. After the change or adjustment of the physical memory space, the HPA forming operation and the disk formatting operation are performed.

Figure 8:
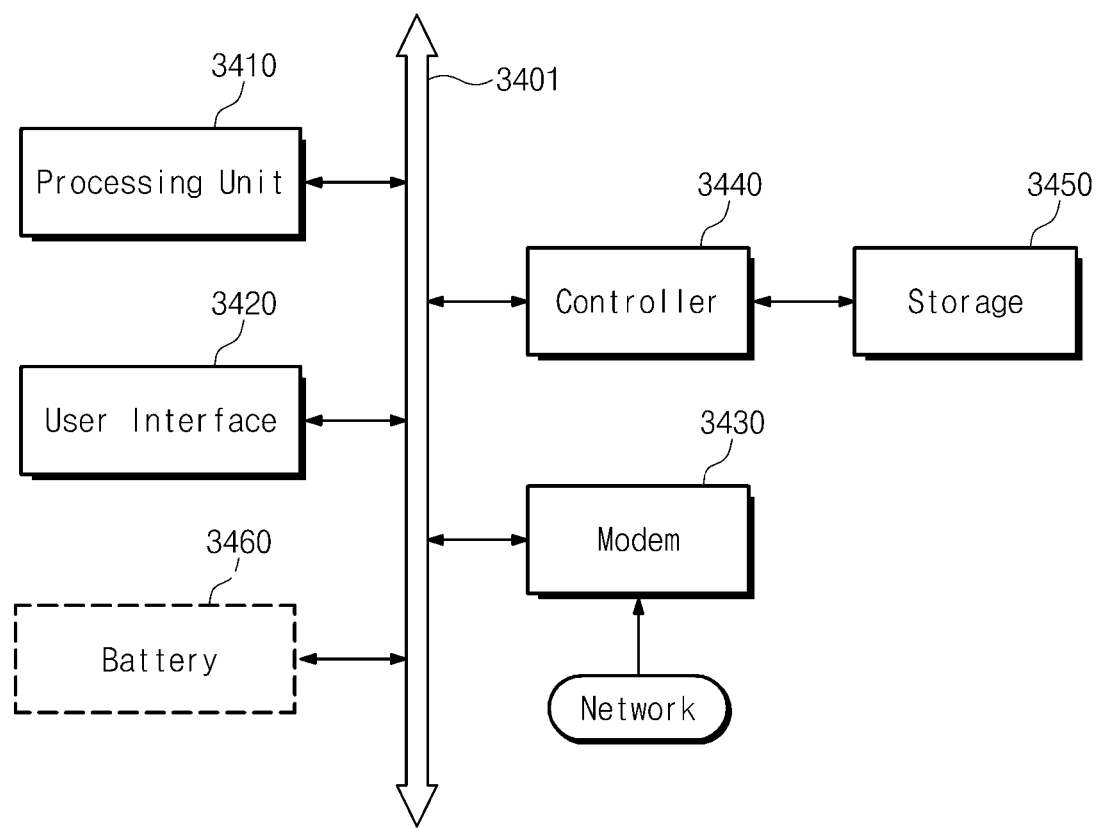
FIG. 8 is a block diagram illustrating a computing system according to an embodiment of the present general inventive concept.

FIG. 8 is a block diagram illustrating a computing system according to an embodiment of the present general inventive concept.

The computing system includes a bus 3401 connected to a microprocessor 3410, a user interface 3420, a modem 3430 as a base band chipset, a controller 3440, and a storage medium 3450. The controller 3440 and the storage medium 3450 may be the same as or similar to the controller 510 and the memory unit 550 of the storage apparatus 500 of FIG. 5. The controller 3440 can control the storage medium 3450 to store N-bit data (N is an integer greater than 1) to be processed by the microprocessor 3410. When the computing system is a mobile apparatus or portable electronic apparatus, for example, the computing system can be provided with a battery 3460 to supply power as an operating voltage to the computing system. In this case, the computing system may further include an application chipset, a camera to capture an image and to generate a signal, a camera image processor (CIS) to control the camera and process the generated signal, a mobile DRAM to temporality store the processed signal or data, a communication interface to communicate with an external station or an external computing system, etc. However, these are well known, and thus detail descriptions thereof will be omitted.

FIGS. 9A through 9E are views illustrating methods of setting a variable memory space of a storage apparatus in a computing system according to an embodiment of the present general inventive concept.

Figure 9A:
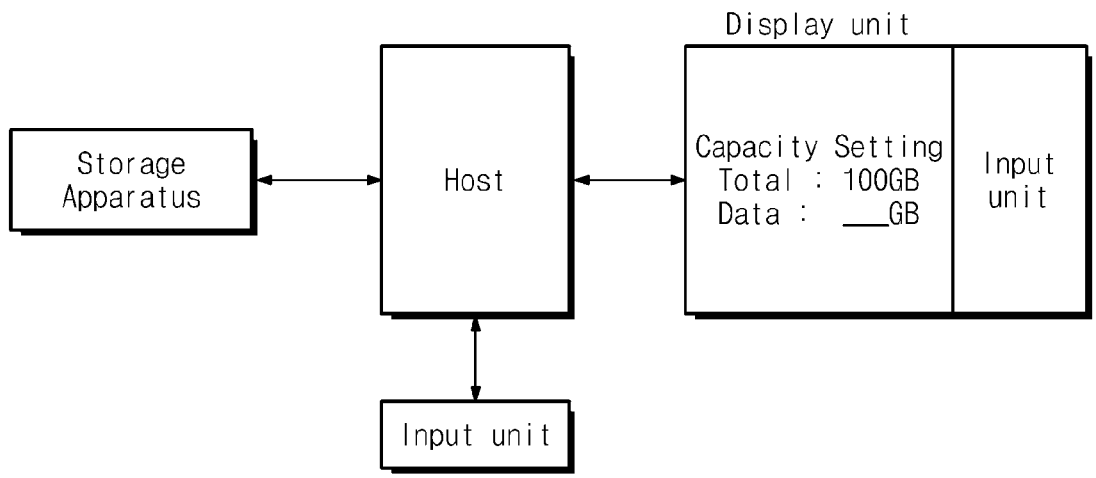
FIGS. 9A through 9E are views illustrating methods of setting a variable space of a storage apparatus in a computing system according to an embodiment of the present general inventive concept.
Figure 9B:
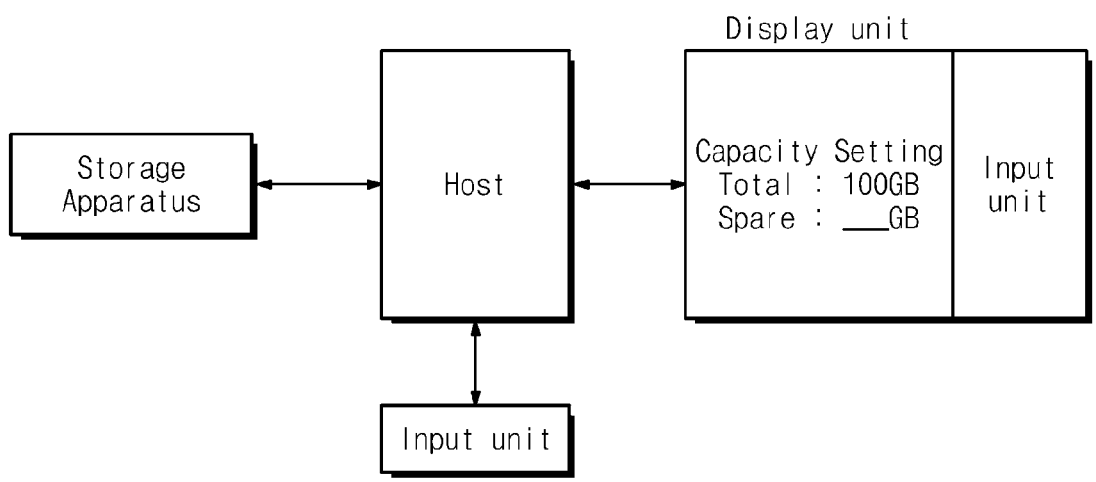
Figure 9C:
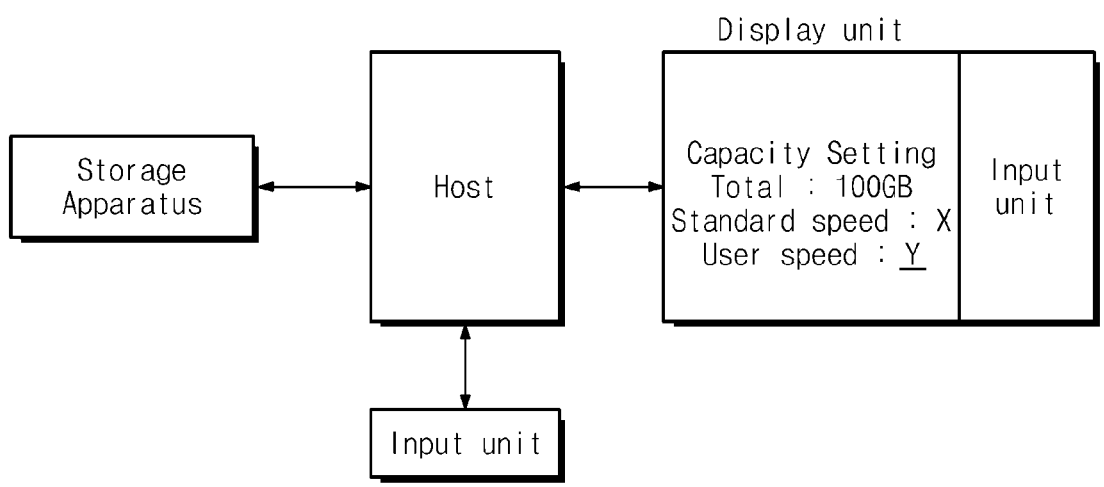
Figure 9D:
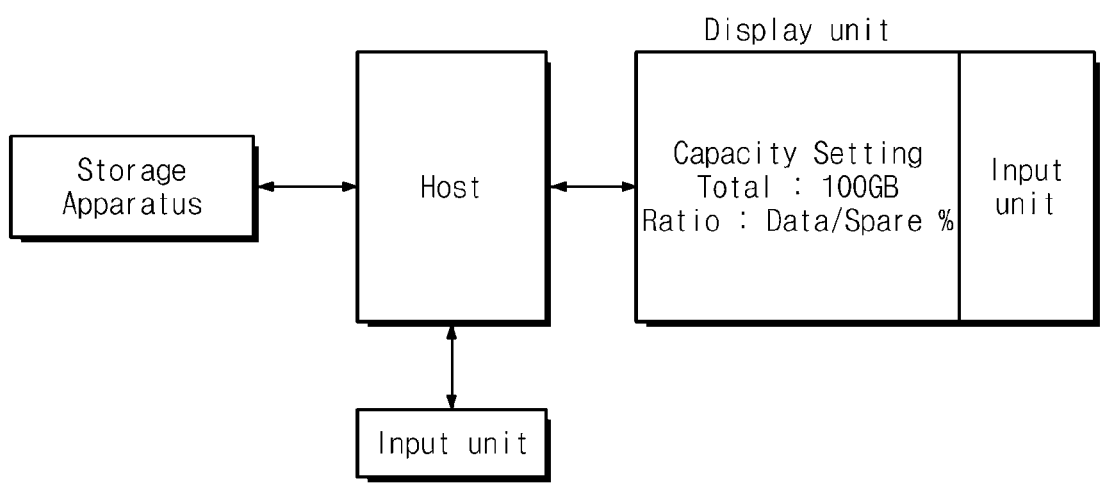
Figure 9E:
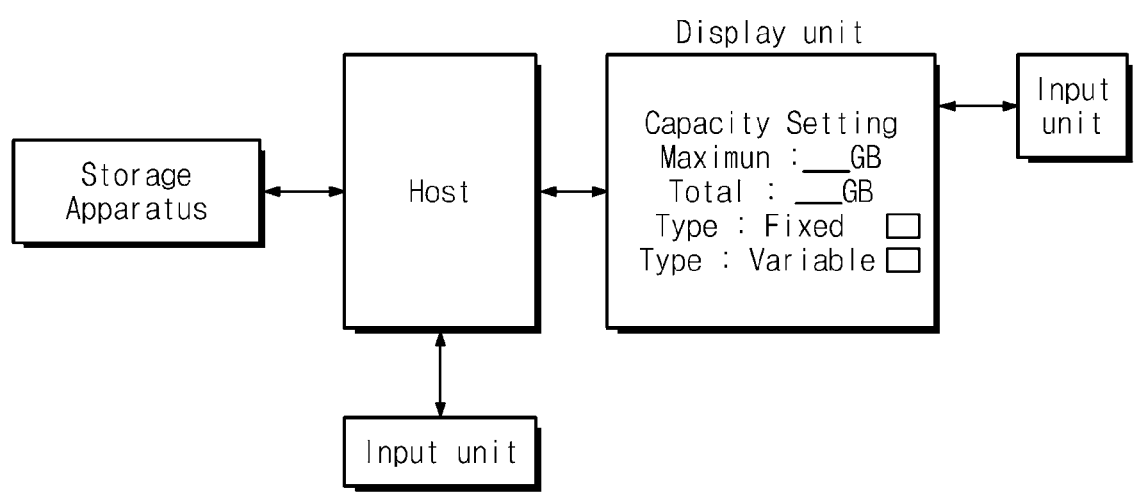

Referring to FIG. 9A, when the storage apparatus is connected to a host apparatus, the storage apparatus outputs a signal indicating that the storage apparatus has a variable memory space (variable physical memory space, variable user address space, and/or variable spare space) to the host apparatus. The host apparatus outputs a signal to control a display unit to display an image as an interface window (menus) through which a capacity setting menu can be displayed. When a screen of the display unit is a touch screen to display the interface window, the touch screen can be used as an input unit to enter data to set up the variable memory space. When the screen of the display unit is not a touch screen, an input unit can be provided to the display unit and/or the host apparatus to enter data to set up the variable memory space. The interface window may include messages of, for example, capacity setting, total memory space: 100 GB, and/or data (user address space) of, for example, a portion of 100 GB of a predetermined or variable data amount. A user can enter data, for example, 80 or 60, for user address space in a data input section adjacent to "GB" as a user preference or selection. It is possible that without a signal from the storage apparatus, the host apparatus automatically generates a signal to control the display unit to display the image as the interface and then transmit the entered data for the user address space as a user preference or selection to the storage apparatus to set up, change, designate or modify the variable memory space.

The storage apparatus controls the variable memory space according to a signal indicating a setup, a change, designation, and/or modification of the variable memory space. In this case, the signal may be received from the host apparatus or an internal input circuit. The internal input circuit may have a circuit to generate the user preference or the user selection.

FIGS. 9B, 9C, 9D, and 9E illustrate various interface windows (or menus) to be displayed on a screen of the display unit. For example, the interface windows may include a combination of capacity setting, total memory space: 100 GB, and/or data (spare space) of, for example, a portion of 100 GB of a predetermined or variable data amount, a combination of capacity setting, total memory space: 100 GB, standard speed and/or user speed, a combination of capacity setting, total memory space: ratio of data/spare %, a combination of capacity setting, maximum capacity, Total capacity, type: fixed with a check box: type: variable with a check box. However, the present general inventive concept is not limited thereto. The interface window may include other types of menus according to the design of the storage apparatus, the host apparatus, and/or the display unit.

Figure 10A:
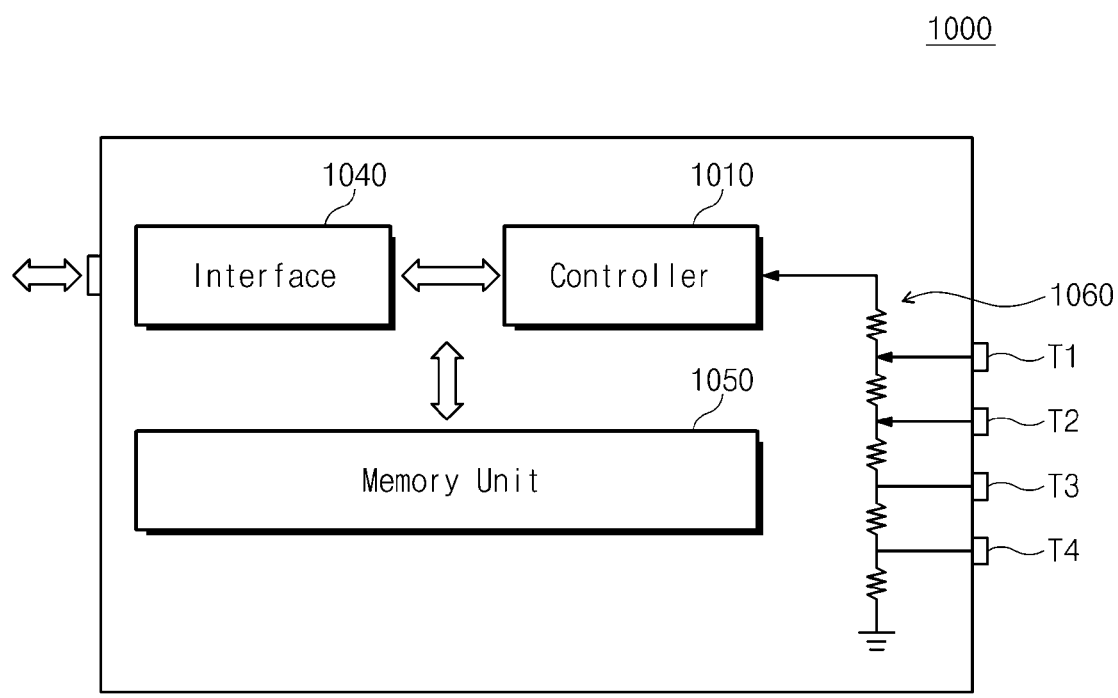
FIGS. 10A and 10B are views illustrating a storage apparatus according to an embodiment of the present general inventive concept.
Figure 10B:
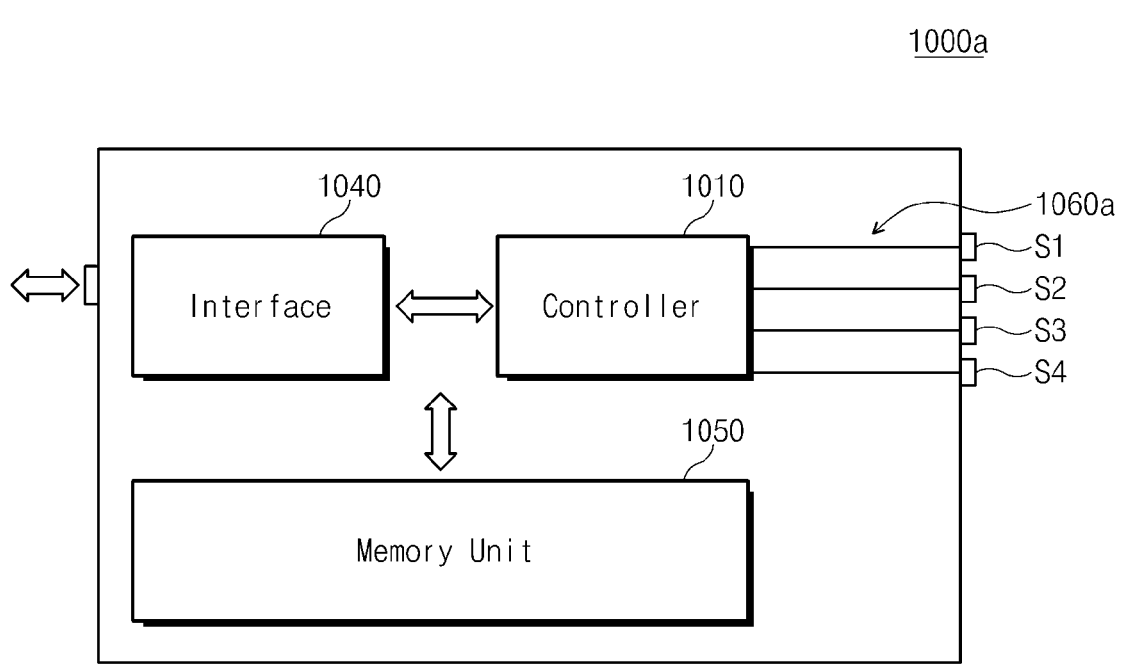

FIGS. 10A and 10B are views illustrating a storage apparatus according to an embodiment of the present general inventive concept.

Referring to FIG. 10A, the storage apparatus 1000 may include a memory unit 1050, an interface 1040 to communicate with a host apparatus, a circuit 1060 to select one of variable memory spaces, and a controller 1010 to control the interface 1040, the circuit 1060, and the memory unit 1050. The memory unit 1050 may have a variable memory space as described above. The circuit 1060 may include one or more switches T1, T2, T3, and T4 to select one of user preferences or selections to set up, change, modify, or designate the variable memory space. When one of switches T1, T2, T3, and T4 is selected or touched, a voltage corresponding to the selected or touched switch can be transmitted to the controller 1010 to determine the user preference or selection to control the storage apparatus 1000 such that the controller 1010 of the storage apparatus 1000 can control the memory unit 1050 to set up change, modify, or designate the variable memory space. As described above, the memory unit 1050 may include a plurality of sub-memory units at least one of which is a memory with a variable memory space or may include a plurality of flash memories as described above.

Referring to FIG. 10B, a storage apparatus 1000a may include a circuit 1060a having positions S1, S2, S3, and S4. When a switch slides along a housing of the storage apparatus 1000a to contact one of the positions 51, S2, S3, and S4 or when a mechanical selection switch moves to indicate the user preference or selection, the controller 1010 can recognize a contact with or operation of the mechanical selection switch to determine the user preference or selection to control the memory unit 1050, as described above.

Figure 11A:
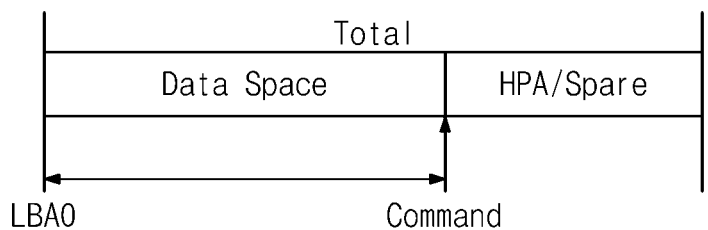
FIGS. 11A, 11B, and 11C are views illustrating a method of generating a command to designate a memory space as a data space and a log and/or free space in a storage apparatus according to an embodiment of the present genera inventive concept.
Figure 11B:
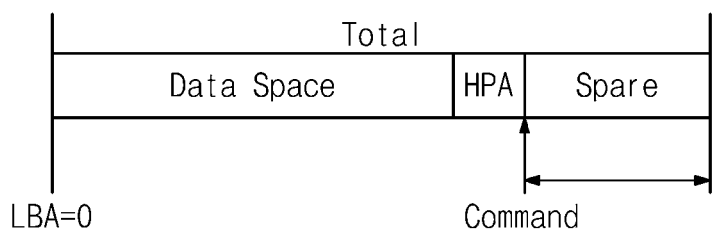
Figure 11C:
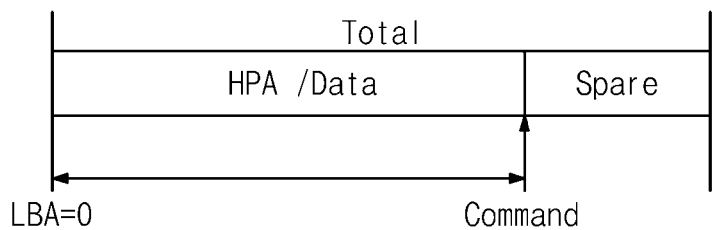

FIGS. 11A, 11B, and 11C are views illustrating a method of generating a command to designate a memory space as a data space and a log and/or free space in a storage apparatus according to an embodiment of the present genera inventive concept.

A command can be transmitted between the host apparatus and the storage apparatus to set up, change, modify, or designate a characteristic of the memory space. Referring to FIG. 11A, the command may indicate a space for a data space (user address space or user data space), and a remaining space (area or region) may include a host protected area (HPA) and/or a spare space. Referring to FIG. 11B, the command may indicate a spare space, and a remaining space (area or region) may be a host protected area (HPA) and/or a user address space. Referring to FIG. 11C, the command may indicate a space for a data space (user address space) and the HPA, and a remaining space (area or region) may include a spare space.

Figure 12:
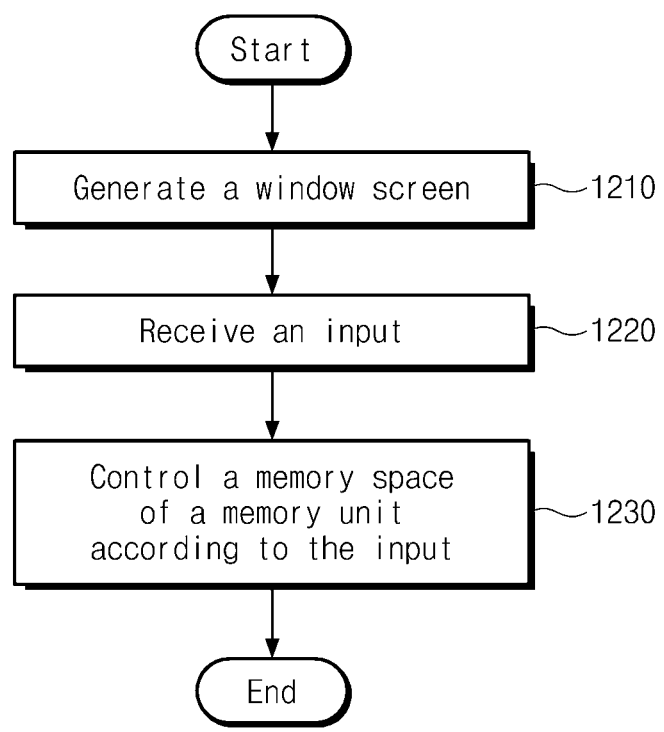
FIG. 12 is a flowchart illustrating a method of controlling a storage apparatus to set a variable memory space according to an embodiment of the present general inventive concept.

FIG. 12 is a flowchart illustrating a method of controlling a storage apparatus to set a variable memory space according to an embodiment of the present general inventive concept. A signal is generated from a storage apparatus or a host apparatus to generate an image corresponding to a window screen (interface window) in operation 1210. A signal is input as an input (user preference or selection) to the storage apparatus or the host apparatus using an input unit according to the window screen in operation 1220. The storage apparatus is controlled to set up, change, designate, or modify a characteristic of a variable memory space of the storage apparatus according to the signal input in operation 1230. It is possible that the method may further include a reading and/or writing operation of reading or write data according to the set up, changed, designated, or modified memory space. Here, the variable memory space is described with terminologies of setup, change, designate, and modify. However, the present general inventive concept is not limited thereto. It is possible that the variable memory space may be adjusted or determined according to the signal.

Figure 13:
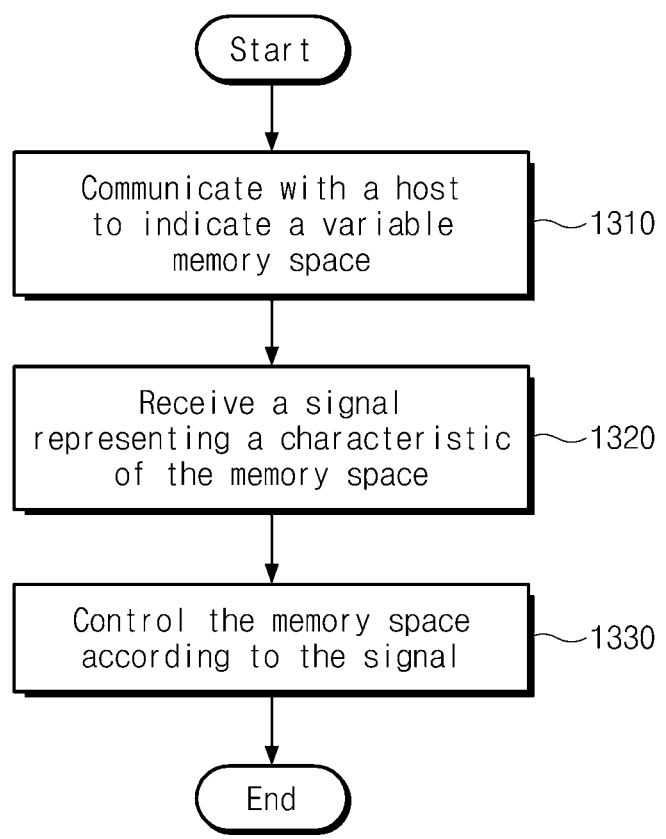
FIG. 13 is a flowchart illustrating a method of setting a variable memory space in a storage apparatus according to an embodiment of the present general inventive concept.

FIG. 13 is a flowchart illustrating a method of setting a variable memory space in a storage apparatus according to an embodiment of the present general inventive concept. Referring to FIG. 13, the storage apparatus communicates with a host apparatus to indicate a variable memory space of the storage apparatus in operation 1310. The host apparatus or the storage apparatus receives a signal representing a characteristic of the memory space in operation 1320, and the memory space is controlled according to the signal in operation 1330.

Figure 14:
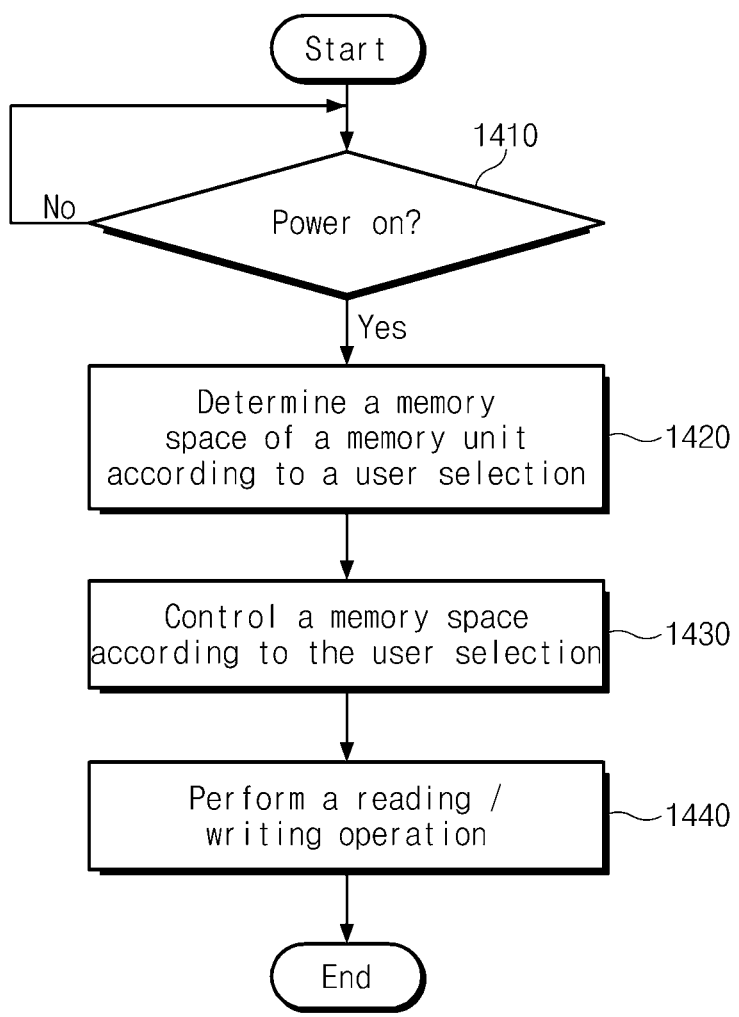
FIG. 14 is a flowchart illustrating a method of determining a variable memory space of a storage apparatus according to an embodiment of the present general inventive concept.

FIG. 14 is a flowchart illustrating a method of determining a variable memory space of a storage apparatus according to an embodiment of the present general inventive concept. Referring to FIG. 14, the storage apparatus or a host apparatus determines a power-on state when being powered on in operation 1410. The storage apparatus or the host apparatus determines a memory space of a memory unit according to a user preference or selection when the power-on-state is determined, in operation 1420. The storage apparatus or the host apparatus controls the memory space according to the user selection in operation 1430. A reading/writing operation is performed on the controlled memory space in operation 1440.

Figure 15:
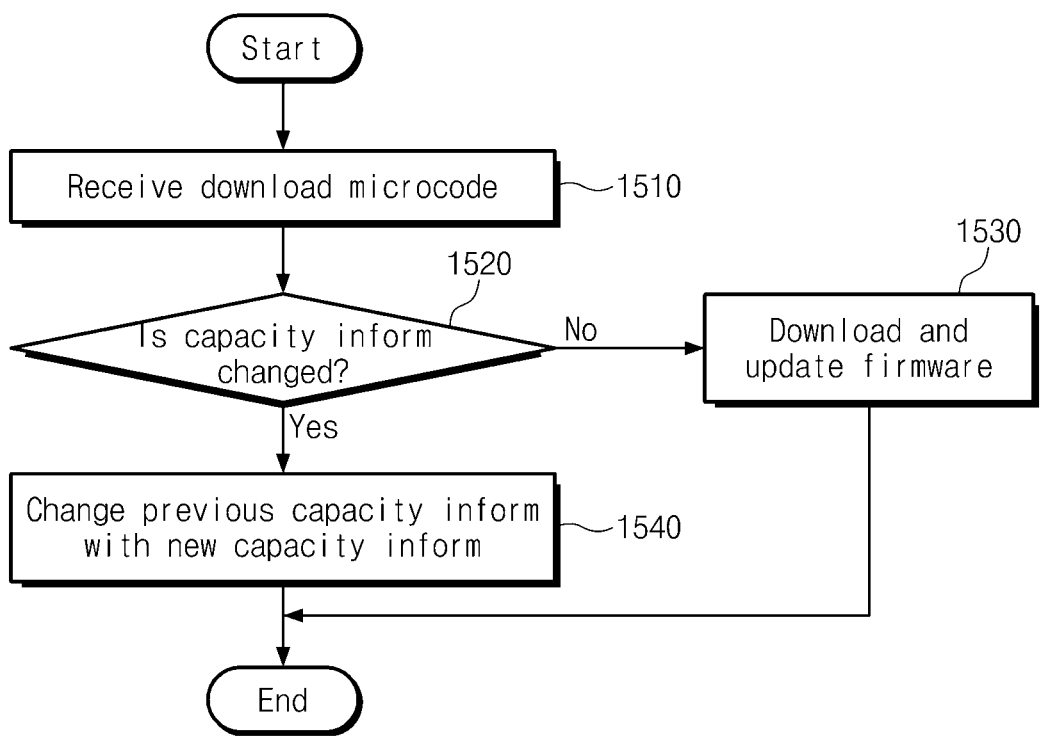
FIG. 15 is a flowchart illustrating a method of changing a physical memory space of a storage apparatus according to an embodiment of the present general inventive concept.

FIG. 15 is a flowchart illustrating a method of changing (determining, adjusting, or setting up) a physical memory space of a storage apparatus according to an embodiment of the present general inventive concept. FIG. 16 is a view illustrating micro codes to change a physical memory space.

Referring to FIGS. 1A, 5, 15 and 16, the flash memory storage apparatus 500 receives a signal, such as micro codes, provided or downloaded from the host apparatus 110 and stored in a memory, for example, the additional memory 520, in operation S1510. The CPU determines whether a predetermined portion (or predetermined bits) of the stored micro codes has been changed in operation S1520. As described in FIG. 16, values of bits (3:0), for example, bits of registers 3, 2, 1, and 0, included in a device register of the downloaded micro codes are set as "0000." That is, bits of $1^{st}$ through $4^{th}$ registers (bits of registers 0, 1, 2, and 3) can be used to change user capacity information (amount information of user capacity or user address space) of the flash memory storage apparatus 500. Accordingly, the CPU determines whether bits of the predetermined registers 0, 1, 2, and 3, are changed, that is, whether the user capacity information is changed.

If the predetermined bits (3:0) of the device register, that is, values of registers to indicate a change of the user capacity information, are not changed, the CPU may control or perform an operation of downloading and/or updating firmware in operation S1530. Since the firmware is well known, detail descriptions thereof are omitted. The operation S1530 may be selectively performed. When the firmware has been already downloaded or installed, the operation is not performed. It is also possible that If the predetermined bits (3:0) of the device register, that is, values of registers to indicate a change of the user capacity information, are not changed, a previously set user capacity or a preset user capacity (amount of the user capacity or user address space) may not be changed but maintained.

If the predetermined bits (3:0) of the device register, that is, values of registers to indicate a change of the user capacity information, are changed, the CPU controls to change previous data included in device data (meta data) stored in the memory unit 550 to indicate the previous capacity information to new capacity information at operation 1540. For example, when the physical space of the previous data is a previous capacity of 120GB, and when the predetermined bit values, that is new capacity information, are changed to "0001," the physical space is changed from 120GB to a first capacity of 100GB. When the predetermined bit values, that is, new capacity information, are changed to "0010," the physical space is changed from 120GB to a second capacity of 80GB. When the predetermined bit values, that is, new capacity information, are changed to "0100," the physical space is changed from 120GB to a third capacity of 50GB. When the previous capacity is changed to new capacity, and any follow-ups necessary to the operation of changing the previous capacity to the new capacity are finished according to the micro codes, the method will be terminated. The new information on the new capacity can be used to indicate a new physical memory space (user address space or user usable memory space) of the storage apparatus 500.

Although the above method illustrates a change of the physical memory space according to the micro codes, the present general inventive concept is not limited thereto. Any other communication signal or data can be used as the micro codes to indicate new user capacity information or a change of user capacity information. It is possible that certain bits of the device register can be used together with a predetermined signature, for example, 0xABABABAB/0xCDCDCDCD, to indicate various user capacity information. For example, the above-described four bits may be used to indicate three different capacities or up to 16 different capacities. However, when the certain bits of the device register are used together with the signature, more than 3 or 16 different capacities can be indicated.

When an interface is provided for communication between the host apparatus and storage apparatus, the interface may be a PATA interface, a SATA interface, a SAS interface, a PCI-express interface, etc. A $92^{nd}$ command of the ATA standard can be used in the PCI-express interface, and the $92^{nd}$ command can also be used according to encapsulation thereof. In this case, the host apparatus may have a device or may be connected to a device to perform the above method using the $92^{nd}$ command of the ATA standard in the PCI-express interface. A micro code download command of the SAS interface may include a write buffer. A value may be used in a predetermined portion of the micro code download command, and the value is transmitted to the $92^{nd}$ command. That is, the command of the write buffer of the SAS interface is received, and converted to the $92^{nd}$ command to be transmitted to the device to indicate the variable user capacity information.

Since the new user capacity information is used to indicate the new physical memory space, and since an original memory space includes a physical memory space and a spare space, the new user capacity information can also be used to indicate a new spare space. That is, the new user capacity information can be used to indicate the new spare space. Accordingly, any information to indicate at least one of the new physical memory space and the spare space can be used to change or setup the new physical memory space and/or the spare space.

Figure 17A:
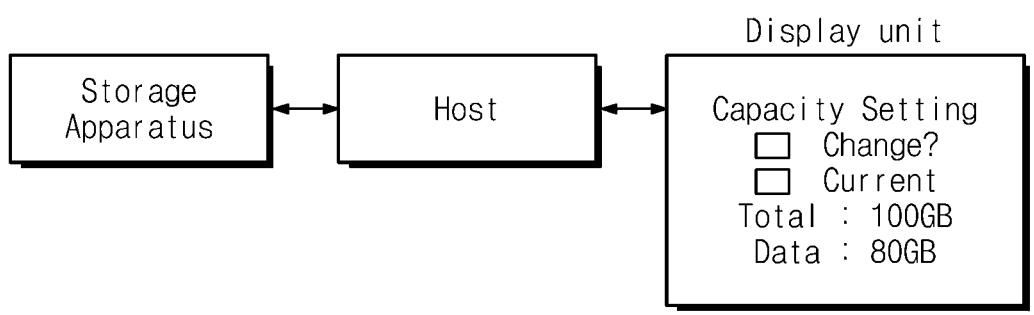
FIGS. 17A and 17B are views illustrating a method of setting a capacity of a memory space of a storage apparatus according to an embodiment of the present general inventive concept.
Figure 17B:
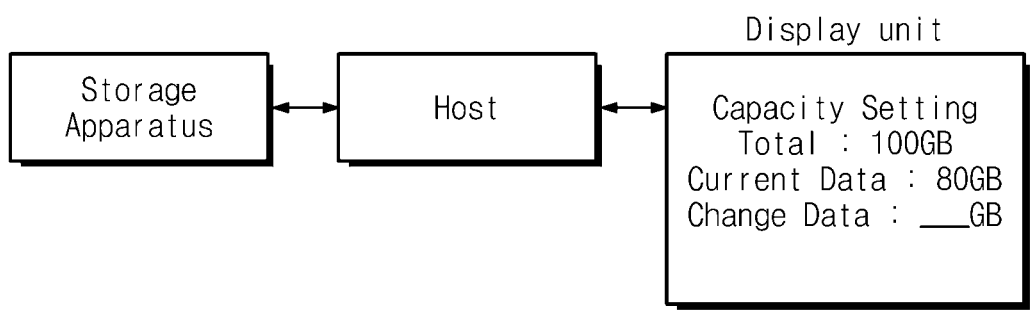

FIGS. 17A and 17B are views illustrating a method of setting a capacity of a memory space of a storage apparatus according to an embodiment of the present general inventive concept.

Referring to FIG. 17A, the storage apparatus or the host apparatus generates a signal to control a display unit to display an interface window to show a capacity setting menu. The capacity setting menu may include a change menu with a check box and a current menu with a check box and total and data spaces, such as 100 GB and 80 GB, respectively. When a user selects the current menu, the storage apparatus or the host apparatus performs the reading and/or writing operation using the current memory space. When a user selects the change menu, as illustrated in FIG. 17B, the interface window is changed to or replaced with a new interface window to show a new capacity setting menu, to set a change of the data space (user address space) from the current data space (user address space) according to a user preference or selection.

Figure 18:
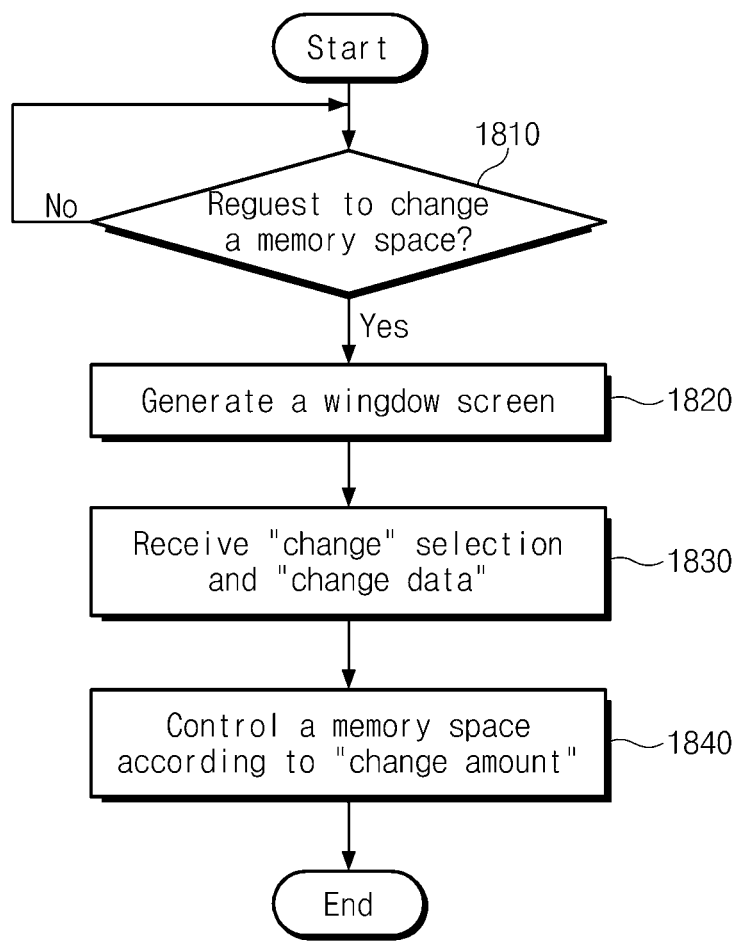
FIG. 18 is a flowchart illustrating a method of changing a variable memory space of a storage apparatus according to an embodiment of the present general inventive concept.

FIG. 18 is a flowchart illustrating a method of changing a variable memory space of a storage apparatus according to an embodiment of the present general inventive concept.

Referring to FIG. 18, the storage apparatus or the host apparatus generates a request to change one or more characteristics of a memory space (physical memory space) in operation 1810. The storage apparatus or the host apparatus generates a signal representing an interface window (window screen) to be displayed on a display unit in operation 1820. The storage apparatus receives a change selection and change data as illustrated in FIGS. 17A and 17B, in operation 1830, using the display unit or an input unit. If the host apparatus receives the change selection and change data from the display unit or the input unit, the host apparatus outputs a signal suitable for the storage apparatus to recognize the signal as the user preference or selection to setup, change, designate, adjust, or modify at least one of the characteristics of the memory space of the memory unit of the storage apparatus in operation 1840. The storage apparatus controls the memory space according to the signal representing the change amount or size of the memory space.

Figure 19:
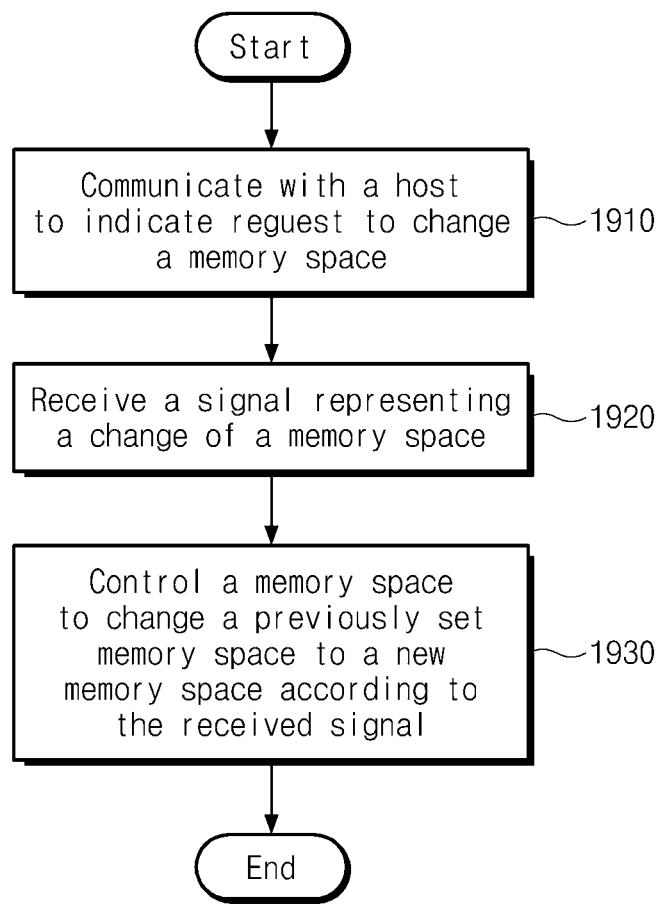
FIG. 19 is a flowchart illustrating a method of changing a variable memory space of a storage apparatus in response to a control signal according to an embodiment of the present general inventive concept.

FIG. 19 is a flowchart illustrating a method of changing a variable memory space of a storage apparatus in response to a control signal according to an embodiment of the present general inventive concept. The storage apparatus communicates with a host apparatus to indicate a request to change a memory space in operation 1910. The storage apparatus receives from the host apparatus a signal to represent a change of the memory space in operation 1920. The storage apparatus controls the memory space to change a current or previously set memory space to a new memory space according to the received signal in operation 1930. The method may further include a reading/writing operation using the new memory space.

Figure 20:
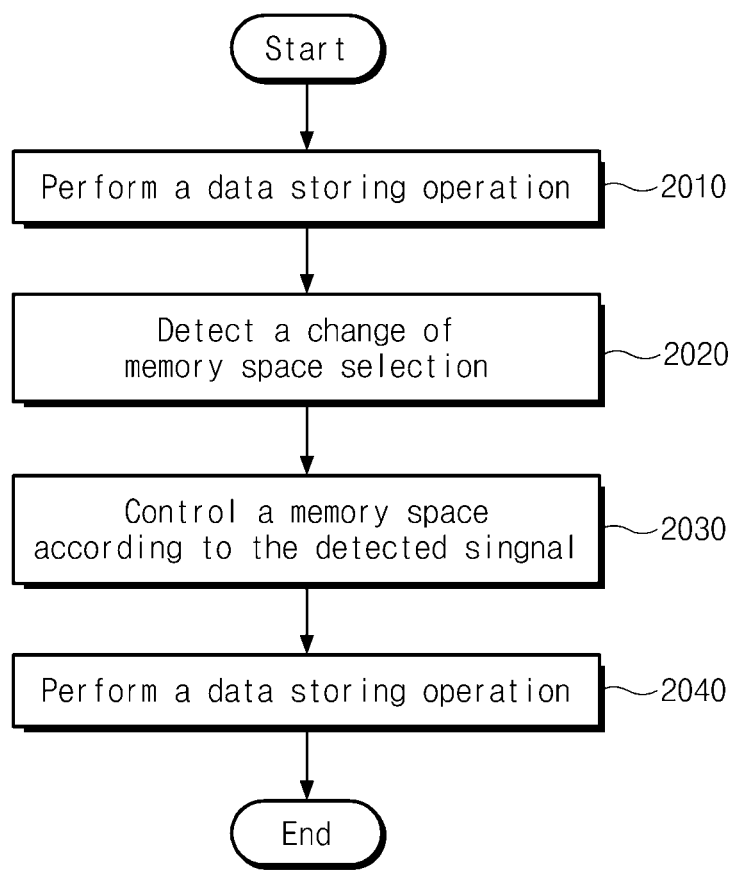
FIG. 20 is a flowchart illustrating a method of changing a variable memory space memory space in response to a user selection according to an embodiment of the present general inventive concept.

FIG. 20 is a flowchart illustrating a method of changing a variable memory space memory space in response to a user selection according to an embodiment of the present general inventive concept. The storage apparatus or the host apparatus performs a data storing (writing) operation in operation S2010 and detects a change of the memory space selection in operation S2020. The storage apparatus or the host apparatus controls the memory space according to the detected signal in operation S2030 to change a characteristic of the memory space of the memory unit of the storage apparatus. The storage apparatus and the host apparatus perform a data storing operation using the changed characteristic of the memory space in operation 2040.

Figure 21:
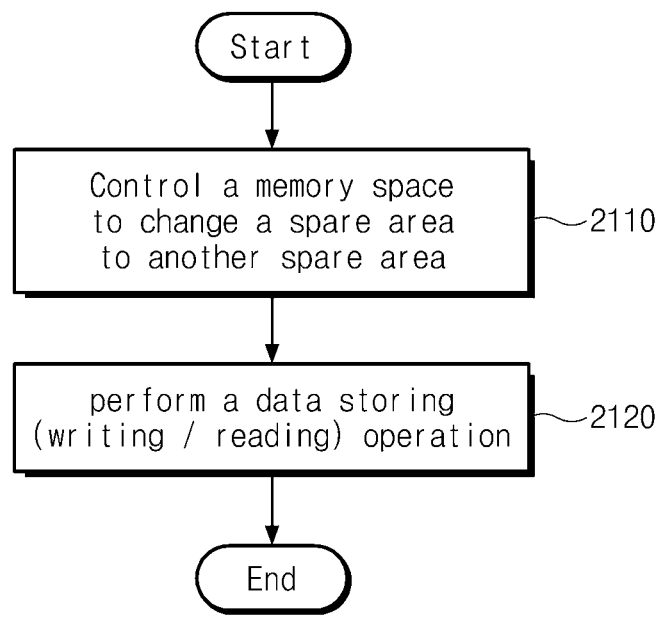
FIG. 21 is a flowchart illustrating a method of controlling a space area of a variable memory space of a storage apparatus according to an embodiment of the present general inventive concept.

FIG. 21 is a flowchart illustrating a method of controlling a space area of a variable memory space of a storage apparatus according to an embodiment of the present general inventive concept. Referring to FIG. 21, the storage apparatus or the host apparatus controls a memory space to change a spare area of a spare space to another spare area of a spare space according to a state of data amount or size or a state of a user preference or selection in operation 2110. And then the storage and the host apparatus perform a data storing operation in operation 2120 using the another spare area of the spare space.

Figure 22:
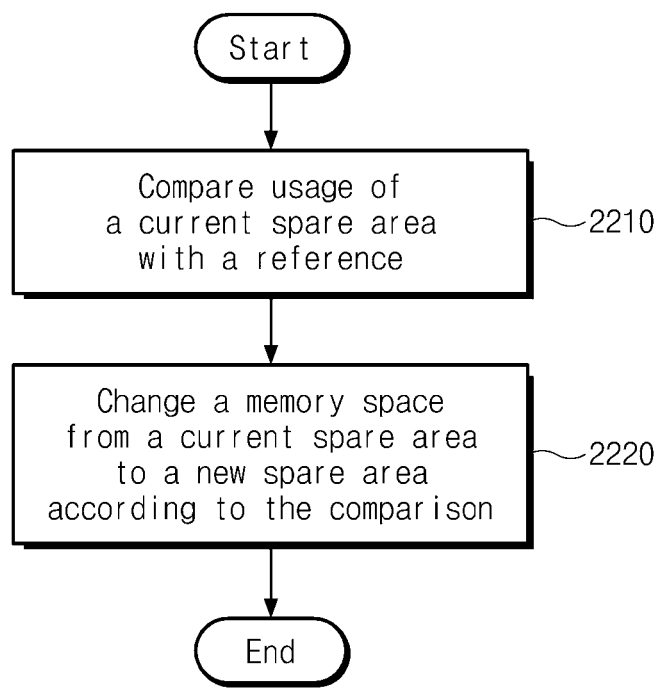
FIG. 22 is a flowchart illustrating a method of changing a memory space from a current spare area to a new spare area according to an embodiment of the present general inventive concept.

FIG. 22 is a flowchart illustrating a method of changing a memory space from a current spare area to a new spare area according to an embodiment of the present general inventive concept. Referring to FIG. 22, the storage apparatus or the host apparatus compares usage of a current spare area with a reference in operation 2210, and changes a memory space from the current spare space to a new spare space according to the comparison, in operation 2220.

The new spare space may be disposed within a physical memory space when the memory unit is a signal memory unit. It is possible that when the memory unit includes a plurality of memory units (sub-memory units), and when the current spare space is disposed in one of the memory units, the new spare space may be disposed in another one of the memory units.

FIGS. 23A, 23B, 23C, and 23D illustrate a storage apparatus having a memory space with a variable spare space location and a variable spare space amount according to an embodiment of the present general inventive concept. FIGS. 24A and 24B illustrate a storage apparatus having a variable memory space to create a new data or spare area and/or to change a location and a amount of a spare space according to an embodiment of the present general inventive concept.

As illustrated in FIGS. 1, 5, 23A-23D, and 24A-24B, when a current location of an area (portion) which has been assigned as a current spare space in the physical memory space is changed to another location of another area (portion) which is a new spare space of the physical memory space, the current location of a portion of the physical memory space is changed as an unused or usable area of the physical memory space or the unused user address space. The current location of the current spare space may not overlap the different location. That is, a new area (portion) of the physical memory space is assigned as a new or next spare space such that the new area of the physical memory space does not overlap the current spare space. In this case, an amount of the spare space assigned in the physical memory space may be less than 50% of a physical space (or RPS). Here, the unused area represents an area in which user data is not stored. When the current location of the current spare space is changed, a new portion (area) to be assigned as the next spare space may be an used area or unused area of the user address space other than the current location of the current spare space (or recently used space) which is assigned as the location of the next spare space portion. When another location of a portion of the physical memory space to be assigned as a new or next spare space is changed, the location of the current spare space can be used or assigned as another new spare space after all the other locations of other portions of the physical memory space have been used or assigned as the spare space. That is, the current location of the portion is a last one to be used or assigned as a new spare space in the physical memory space.

As described above, the portions of the spare space corresponding to the current spare space and the new (next) spare space may not overlap each other. However, the new (next) spare space may have a location of a portion to partially overlap with a recent or current location of a current spare space. In this case, the partially overlapped location of the portion can be used or assigned as another new spare space after all the other locations of other portions of the physical memory space have been used or assigned as the spare space.

When the location of the spare space is changed, an amount (size or area) of the spare space can be changed if necessary. The memory blocks of the spare space may have physically sequentially or non-sequentially arranged. That is, the memory blocks of the spare space may be disposed non-sequentially in physical location in the physical memory space. For example, it is possible that when the memory blocks included in the spare space are disposed or arranged between a starting address and an ending address, the memory blocks of the spare space are physically sequentially arranged or disposed. It is also possible that when the memory blocks included in the spare space are not arranged or disposed between a starting address and an ending address, the memory blocks of the spare space are not physically sequentially arranged or disposed. That is, the spare space can be formed with a plurality of physically non-sequential regions. Within each of the non-sequential regions, the memory blocks may be sequentially arranged or disposed. Accordingly, one or more blocks other than the memory blocks of the spare space can exist between the non-sequential regions of the spare space.

Figure 23A:
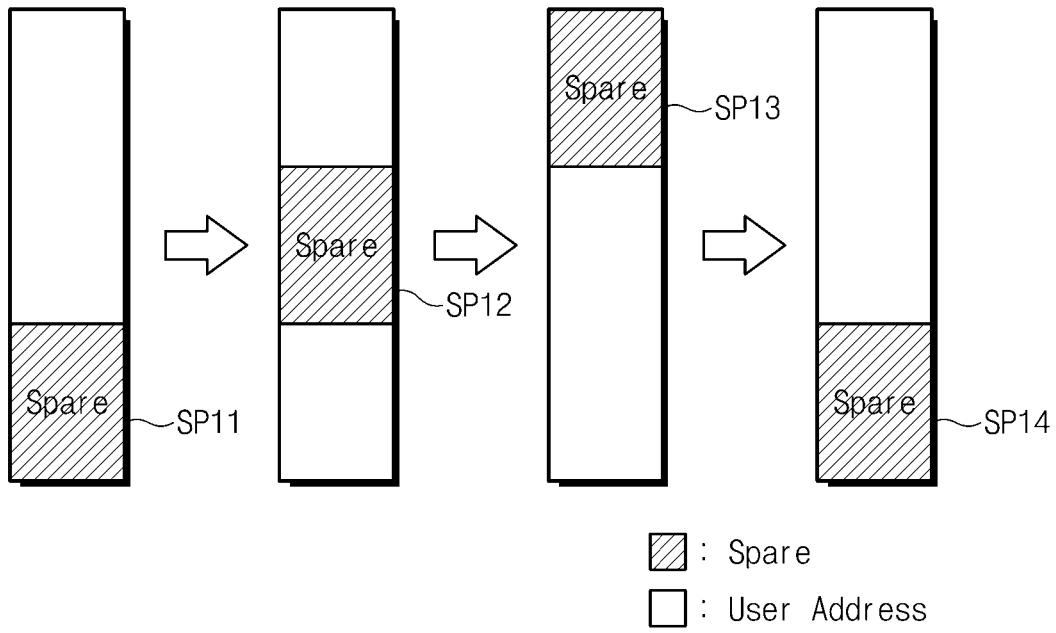
FIGS. 23A through 23D are views illustrating a storage apparatus having a variable memory space with a variable spare space location and a variable spare space amount according to an embodiment of the present general inventive concept.
Figure 23B:
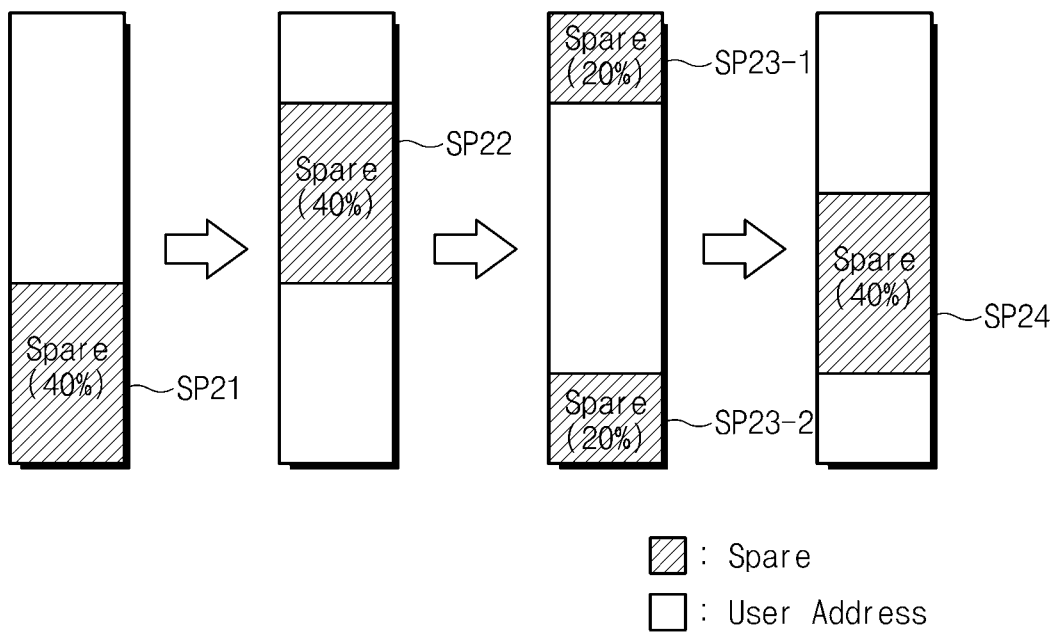
Figure 23C:
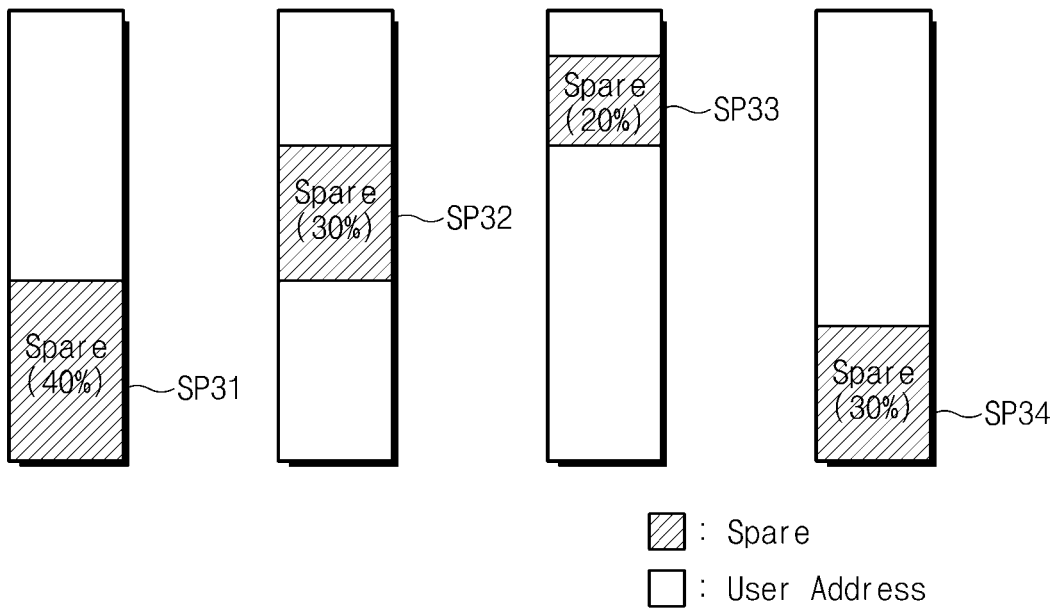
Figure 23D:
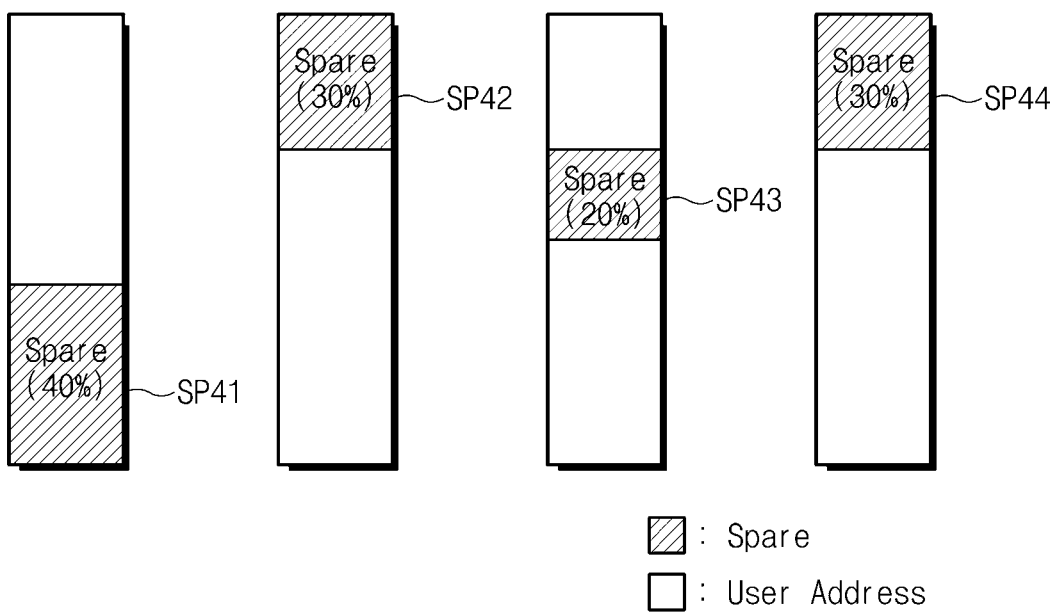
Figure 24A:
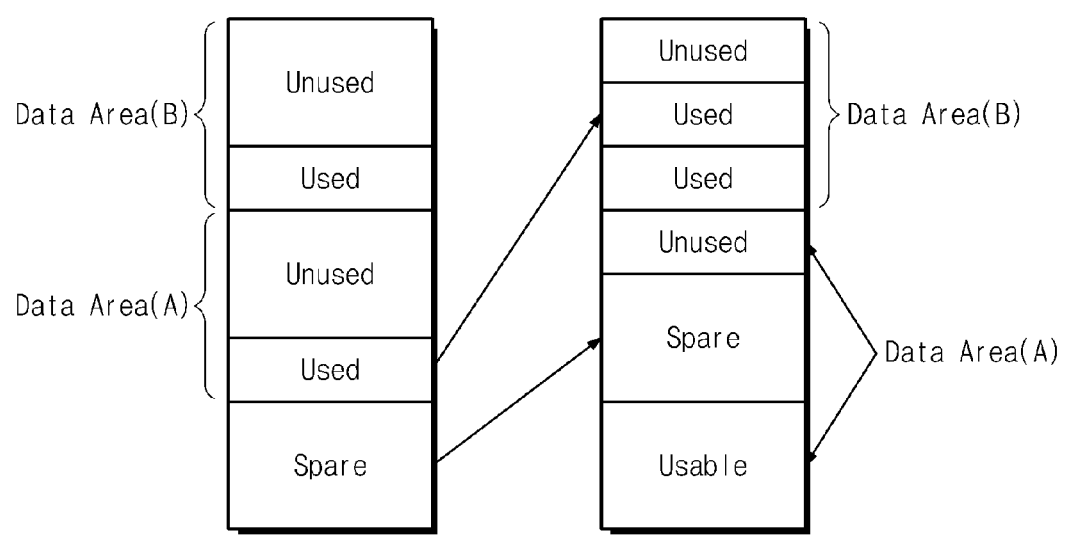
FIGS. 24A and 24B are views illustrating a storage apparatus having a variable memory space to create a new data or spare area and/or to change a location and a amount of a spare space according to an embodiment of the present general inventive concept.
Figure 24B:
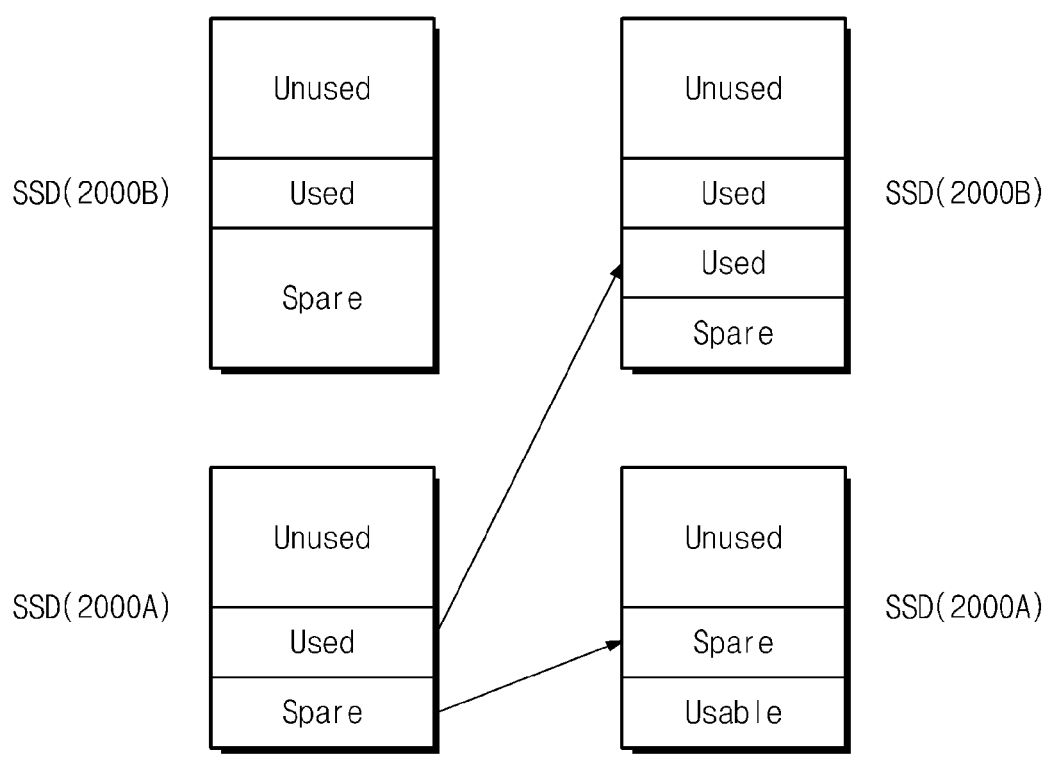

When the RPS is equally divided into a plurality of regions, for example, three equal regions SP11, SP12, and SP13, one of the three equal regions of the RPS is assigned as the spare space, and remaining ones of the three equal regions can be used as a user address space or a physical space as illustrated in FIG. 23A. The three regions SP11, SP12, and SP13 can be sequentially used or assigned as the spare space. The current region SP11 assigned as the current spare space can be used as a new region SP14 to correspond to a new or next spare space when other regions SP12 and SP13 have been used or assigned as a spare space. FIG. 23A illustrates that the location of the spare space is changed without changing the amount (size or area) of the spare space. However, FIG. 23B illustrates portions SP21, SP22, SP 23-1 and 23-2, and SP24 to correspond to the changed spare space without changing the amount (size or area) of the spare space, the spare space can be formed with at least two spare segments, for example, SP23-1 and SP 23-2 according to the amount of the spare space. Therefore, FIGS. 23A and 23B illustrate that a location of the spare space is changed without changing the amount of the spare space. However, it is possible that the amount (size or region) can be changed when the location of the current spare space is changed. For example, the spare space SP31 or SP41 has an amount of 40% of the physical memory address or the RPS as illustrated in FIGS. 23C and 23D, and the amount of the spare spaces SP32, SP 33, SP 34, SP 42, SP 43, and SP 44 can be changed as 30% or 20%. However, the present general inventive concept is not limited thereto. It is possible that the amount of the portion of the physical memory address can be 25% or 15% other than 20% and 30%. Accordingly, an amount of a portion of the physical memory space to correspond to a next or new spare space can be set to be different from the amount of the current spare space.

FIG. 23A illustrates a sequential assigning method, and FIGS. 23B, 23C, and 23D illustrate a non-sequential assigning method, that is, a random assigning method. When the location of the spare space is changed according to the sequential assigning method or the non-sequential method, when the entire areas of the physical memory space can be equally or uniformly used so that a wear leveling can be achieved in the physical memory space.

Referring to FIG. 24A, the physical memory space (or RPS) can be formed with two data areas A and B and a spare area. The data area may be a semiconductor memory chip or a block unit of the semiconductor chip or a minimum unit to perform an erasing operation in a NAND flash memory. A location of the spare space may be changed to an unused area. As illustrated in FIG. 24A, the location of the spare space can be changed to a used or usable area storing user data. In this case, the user data stored in the used area of the data area A is moved to an unused area of the data area B, and the used area of the data area A is erased. The unused area may be a unit of a plurality of semiconductor memory chips as a package, a semiconductor chip, or one of units or areas included in a semiconductor memory chip. When the units or areas are a block unit, the block unit may be a free block. The location of the spare space can be changed to an unused area that is an erased usable (used) area after the user data has been erased. In this case, the amount of the spare space can be adjusted or changed if necessary. FIG. 24A illustrates that the spare space is changed to the data area A, and the location of the spare space can also be changed to one of unused (or usable) areas of the data area A or B. when a unit of the area is a block unit, the area storing data can be a user data area, and the unused area can be a free block.

Referring to FIG. 24B, the flash memory storage apparatus 500 of FIG. 5 may have a plurality of semiconductor drives (or solid state device (SSD)) 2000A and 2000B. Each of the semiconductor drives 2000A and 2000B may have a spare space. As described in FIG. 24A, the location of the spare space can be changed to a used area storing user data. In this case, the user data stored in the used area of the semiconductor drive 2000A is moved to a spare space of the semiconductor drive 2000B, and the used area of the semiconductor drive 2000A is erased. The location of the spare space is changed to an erased used area, that is, unused area or usable area. It is also possible that a used or usable area to be used as the spare space can be changed to the semiconductor drive 2000A.

According to the present embodiment, it is possible that an amount of the unused area is smaller than an amount of a next spare space. In this case, the amount of the next spare space can be decreased.

The spare space may have abrasive or wearable more than the user address space since a relative large program and an erasing operation are repeated. Therefore, as described in FIGS. 23A through 23D and FIGS. 24A and 24B, it is possible to extend a life span of the flash memory storage apparatus 500 by changing the location of the spare space. That is, the flash memory storage apparatus 500 can have a longer life span by performing a wear-leveling operation. The relocating of the spare space can be performed under control of the host apparatus 110 or flash memory storage apparatus 500. The changing of the location of the spare space may require a formatting operation of the flash memory storage apparatus 500. It is possible that the changing of the location of the spare space may not require a formatting operation of the flash memory storage apparatus 500.

The location and amount (size) of the spare space can be changed using a new command or a command used in the interface of the flash memory storage apparatus 500, for example, PATA interface, SATA interface, SAS interface, PCI-express interface, etc. For example, a change of the location and/or amount (size) of the spare space is requested by a user, the host apparatus 110 generates a signal to request the flash memory storage apparatus 500 to change the location and/or amount according to a command used in the interface. A user can control the flash memory storage apparatus 500 to perform the changing operation using a command input through a user interface. The user sets values of BIOS to request the change of the location and/or amount of the spare space. The changing of the location of the spare space requested by the user may require a formatting operation of the flash memory storage apparatus 500.

The changing operation of changing the location and/or amount of the spare space can be performed without a user request. For example, the changing operation of changing the location and/or amount of the spare space can be performed periodically or according to a predetermined condition. When a usage period of the current spare space is greater than a reference period, the changing operation can be performed to change the location and/or amount of the spare space. In this case, since an erase count to store the number of erasing frequencies is not included in each block, a portion of the memory space corresponding to the erase count can be used as a space to provide a more a user capacity to the user or the flash memory storage apparatus 500. Since a program to manage or monitor a wearing or abrasive state of the spare space becomes simple, an operating speed thereof becomes faster, and an operating time is shortened. This can be done through the FTL of the flash memory storage apparatus 500 or host apparatus 110. The location (relocation) and/or amount (size) of the spare space can be done when the predetermined condition is satisfied. This can also be done through the FTL of the flash memory storage apparatus 500 or host apparatus 110. The predetermined condition may be set to have at least one of various conditions, for example, erasing frequency, merge frequency, etc. In this case, the changing of the location of the spare space requested by the user may also require a formatting operation of the flash memory storage apparatus 500.

Although FIGS. 23A through 24B illustrate the changing of the location and/or amount of the spare space, the present general inventive concept is not limited thereto. The changing of a characteristic of the physical memory space can be performed using other method.

Figure 25:
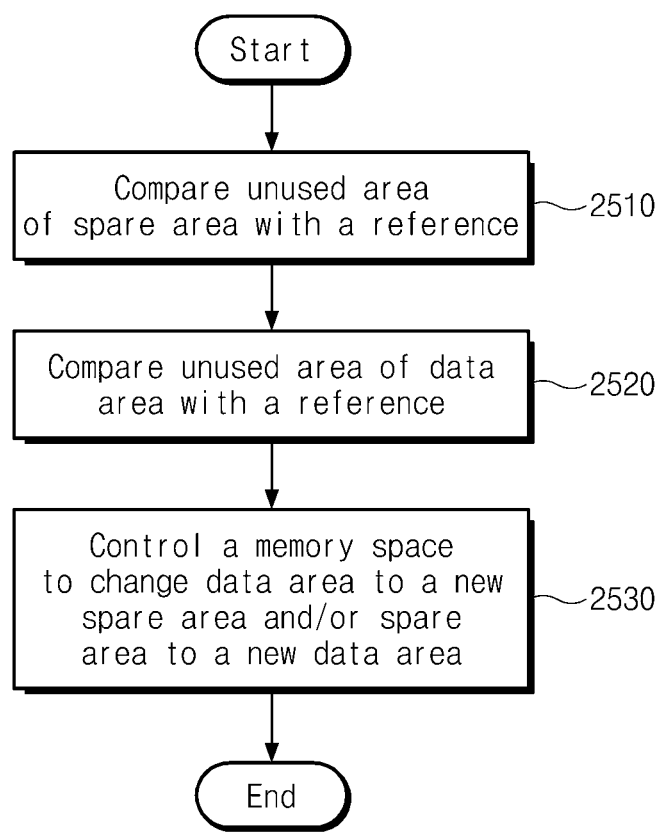
FIG. 25 is a flowchart illustrating a method of creating a new data or spare area from a used area according to an embodiment of the present general inventive concept.

FIG. 25 is a flowchart illustrating a method of creating a new data area or spare area from a used area according to an embodiment of the present general inventive concept. Referring to FIG. 25, an unused area of a spare area of a spare space is compared with a first reference in operation 2510. An unused area of a data area of a user address space is compared with a second reference in operation 2520. A memory space of a memory unit of a storage apparatus can be controlled to change the data area of the user address space to a new spare area and/or to change the spare area of the spare space to a new data area of the user address space according to at least one of the comparisons, in operation 2530.

Figure 26:
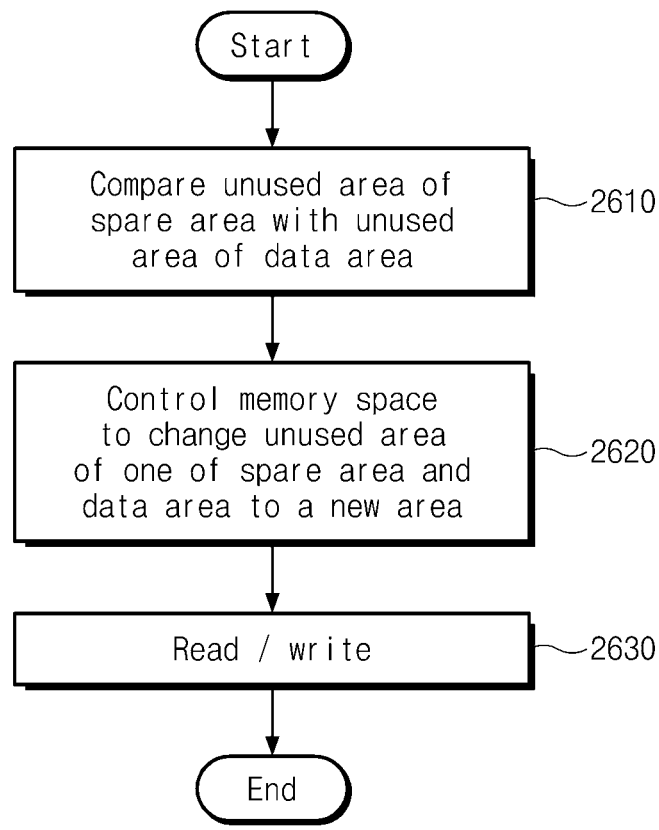
FIG. 26 is a flowchart illustrating a method of creating a new data or spare area from a used area according to an embodiment of the present general inventive concept.

FIG. 26 is a flowchart illustrating a method of creating a new data or spare area from a used area according to an embodiment of the present general inventive concept. Referring to FIG. 26, an unused area of a spare area of a spare space is compared with an unused area of a data area of a user address space in operation 2610. A memory space of a memory unit of a storage apparatus is controlled to change an unused area of one of the spare area and the data area to a new area for the spare area or the data area in operation 2620. A reading and/or writing operation is performed using the changed area in operation 2630.

Figure 27:
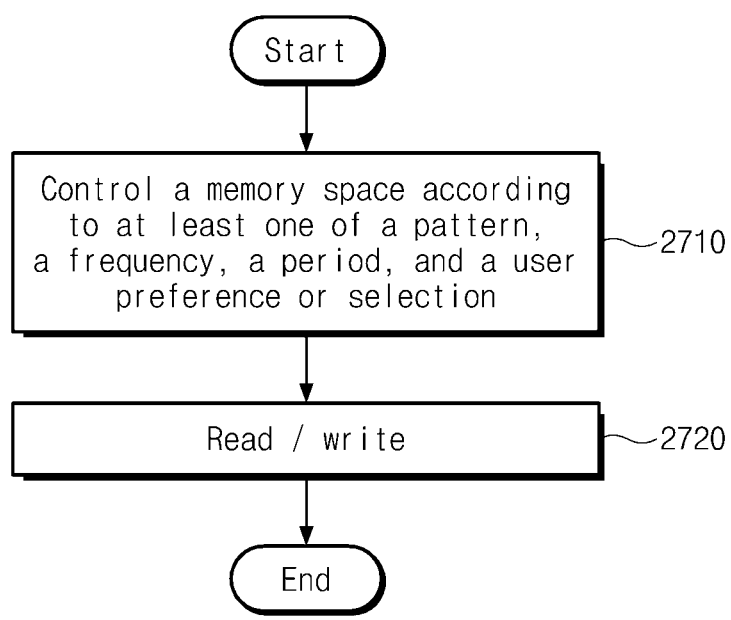
FIG. 27 is a flowchart illustrating a method of reading or writing data using a variable memory space of a storage apparatus according to an embodiment of the present general inventive concept.

FIG. 27 is a flowchart illustrating a method of reading or writing data using a variable memory space of a storage apparatus according to an embodiment of the present general inventive concept. Referring to FIG. 27, a memory space is controlled according to at least one of a pattern, a frequency, a period, and a user preference or selection in operation 2710. A read/writing operation is performed in the controller memory space in operation 2720.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As describe above, performance of a storage apparatus is improved using a variable memory space thereof. The variable memory space may include at least one of a variable user address space and a spare space.

As described above, a memory space of a memory unit of a storage apparatus is not set up as a user data area and a spare area when the storage apparatus is manufactured. The memory space of the memory unit of the storage apparatus is not simultaneously set up as the user data area and the space area when the memory space is set up in the memory unit. The memory space may be set up as the user data area and the spare area after a host protected area (HPA) is set up in the storage apparatus. It is possible that the HPA may not be set up when the storage apparatus is manufactured to include the memory space of the memory unit. It is also possible that the memory space may be set up as the user data area and the spare area before a host protected area (HPA) is set up in the storage apparatus according to a signal or command from an external apparatus.

As described above, speed of a storage apparatus becomes faster by controlling a characteristic of a memory during writing and/or reading.

As described above, capacity of a storage apparatus is variable according to a variable physical memory space.

As described above, a life span of a storage apparatus is extended according to change of a variable physical memory space.

Although performance, speed, capacity, and life span of a storage apparatus are described, the present general inventive is not limited thereto. It is possible that a storage apparatus with a variable memory space can provide convenience to a user in storing a large amount of data or in frequently deleting or storing data.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A storage apparatus comprising:
    a memory unit including a memory space comprising a user data space and a spare space, the spare space defining a first area of the memory space; and
    a controller to set up the memory space of the memory unit according to a signal representing at least one of the user data space and spare space to change a location and an amount of the spare space to a second area of the memory space such that the second area is free from overlapping the first area and a total size of the user data space and spare space remain constant.

2. The storage apparatus of claim 1, wherein the controller designates one or more portions of the memory space of the memory unit as the user data space and the spare space after receiving the signal indicating the user data space or the spare space.

3. The storage apparatus of claim 1, wherein the memory unit comprises a circuit to generate the signal according to a user preference such that the controller defines the memory space as the user data space and the spare space according to the signal.

4. The storage apparatus of claim 1, further comprising:
    a housing having a terminal to be connected to an external device to receive the signal,
    wherein the memory unit and the controller are disposed in the housing.

5. The storage apparatus of claim 4, wherein the signal comprises a command generated by the external device to represent a portion of the memory space.

6. The storage apparatus of claim 1, wherein the controller receives the signal between a reading and/or writing process and another reading and/or writing process and divides the memory space as a data block area and a log block area according to the received signal.

7. The storage apparatus of claim 1, wherein the controller generates another signal to control an external apparatus to display a menu, and the signal is input according to the displayed menu to indicate a change of the memory space.

8. The storage apparatus of claim 1, wherein:
    the memory space comprises blocks to be determined as data blocks and log blocks; and
    the controller determines a ratio of the data blocks and the log blocks within the memory space of the memory unit according to a character of the signal from an external device.

9. The storage apparatus of claim 8, wherein the ratio of the log blocks and the data blocks is variable according to the character of the signal of the external device.

10. The storage apparatus of claim 5, wherein the portion of the memory space is not predetermined before the controller receives the signal from the external device.

11. The storage apparatus of claim 1, wherein:
    the controller receives the signal during an initial setup process to divide the memory space as a data block area and a log block area, and
    the data block area comprises a plurality of data blocks, each data block being a data block to store data; and
    the log block area comprises a plurality of log blocks, each log block being a log block to temporarily store log data corresponding to the data.

12. The storage apparatus of claim 11, wherein each log block is an empty block which is not used to store data when the data is stored in the data block.

13. The storage apparatus of claim 11, wherein:
    the log block comprises a log sub block and a free sub block;
    the log sub block is changed to the free sub block; and
    the free sub block is changed to the log sub block.

14. The storage apparatus of claim 1, wherein:
    the controller determines a portion of the memory space of the memory unit as a log block of the spare space, and determines another portion of the memory space of the memory unit as a data block of the user data space to increase an operating speed of processing data to be stored in the data block, using the log block.

15. The storage apparatus of claim 1, wherein:
    the controller determines a portion of the memory space of the memory unit as a log block of the spare space and then determines another portion of the memory space of the memory unit as a data block to increase an amount of data to be stored in the data block, using the log block.

16. The storage apparatus of claim 5, wherein:
    the controller determines the portion of the memory space of the memory unit as a log block of the spare space and then determines another portion of the memory space of the memory unit as a data block of the user data space such that a ratio between the portion and the another portion is changed according to the signal.

17. A storage apparatus comprising:
    a memory unit having a memory space comprising a user data space and a spare space, the spare space defining a first area of the memory space; and
    a controller to output a signal to an external apparatus to indicate that the memory space is a variable memory space, and to control the memory space to have spare space at a second area of the memory space upon receiving another signal from the external apparatus in response to the output signal, the second area being free from overlapping the first area and a total size of the user data space and spare space remain constant.

18. A host apparatus comprising:
    an interface to generate an interface signal representing a window to be displayed to receive an input from a user; and
    a controller to generate a signal, according to the input, to a storage apparatus, and to control the storage apparatus to determine a portion of a memory space comprising a log block of a memory unit of the storage apparatus as a second log block according to the generated signal, the second log block being free from overlapping the log block, wherein the memory space comprises a data block and the log block, and a total size of the data block and the log block remain constant.

19. The host apparatus of claim 18, wherein the signal generated from the controller comprises a ratio between an area of the data block and an area of the log block, a relative location between the area of the data block and the area of the log block, a size of the data block, or a size of the log block.

20. The host apparatus of claim 18, wherein the controller receives the total size of the memory space from the storage apparatus and the portion of the memory space is included in the total size of the memory space.

* * * * *